(12) United States Patent
Uchida et al.

(10) Patent No.: US 8,159,924 B2
(45) Date of Patent: Apr. 17, 2012

(54) OPTICAL DISC DEVICE AND MEDIA TYPE DETERMINATION METHOD

(75) Inventors: Masaki Uchida, Osaka (JP); Koichiro Ogihara, Tokyo (JP)

(73) Assignee: Sony Corporation, Tokyo (JP)

( * ) Notice: Subject to any disclaimer, the term of this patent is extended or adjusted under 35 U.S.C. 154(b) by 379 days.

(21) Appl. No.: 12/395,820

(22) Filed: Mar. 2, 2009

(65) Prior Publication Data
US 2009/0245071 A1    Oct. 1, 2009

(30) Foreign Application Priority Data

Mar. 31, 2008    (JP) .................... 2008-092058

(51) Int. Cl.
*G11B 7/135* (2012.01)
*G11B 11/00* (2006.01)

(52) U.S. Cl. .............. 369/112.23; 369/53.23
(58) Field of Classification Search ........... 369/53.23
See application file for complete search history.

(56) References Cited

U.S. PATENT DOCUMENTS

| 6,285,641 | B1 * | 9/2001 | Dang et al. ........ 369/53.41 |
| 7,193,954 | B2 * | 3/2007 | Yagi et al. ........ 369/112.01 |
| 2009/0022021 | A1 * | 1/2009 | Watanabe et al. ........ 369/47.15 |

FOREIGN PATENT DOCUMENTS

| JP | 10-49885 | 2/1998 |
| JP | 2003-157545 | 5/2003 |
| JP | 2006-4528 | 1/2006 |

OTHER PUBLICATIONS

Japanese Office Action mailed Dec. 20, 2011, issued for JP Application No. 2008-092058 filed Mar. 31, 2008 (with English Translation).
Kameno, Seiji "Spectrum and Signal Analysis," Space Science Hanron the 3$^{rd}$, Apr. 23, 2007, pp. 1-10.

* cited by examiner

*Primary Examiner* — Joseph Haley
*Assistant Examiner* — Nicholas Lee
(74) *Attorney, Agent, or Firm* — Oblon, Spivak, McClelland, Maier & Neustadt, L.L.P.

(57) ABSTRACT

A device includes: an objective lens that serves as a lens having a first numerical aperture when a first optical beam corresponding to a first optical disc converges on the first optical disc while serving as a lens having a second numerical aperture when a second optical beam corresponding to a second optical disc converges on the second optical disc; a section that generates a reflection optical signal from the first or second optical beam reflected by the first or second optical disc; and a section that determines whether an unknown disc is the first optical disc based on a degree of matching between the waveform of the reflection optical signal obtained when the first optical beam is emitted to the first optical disc, and the waveform of the reflection optical signal obtained when the first optical beam is emitted to the unknown disc.

12 Claims, 17 Drawing Sheets

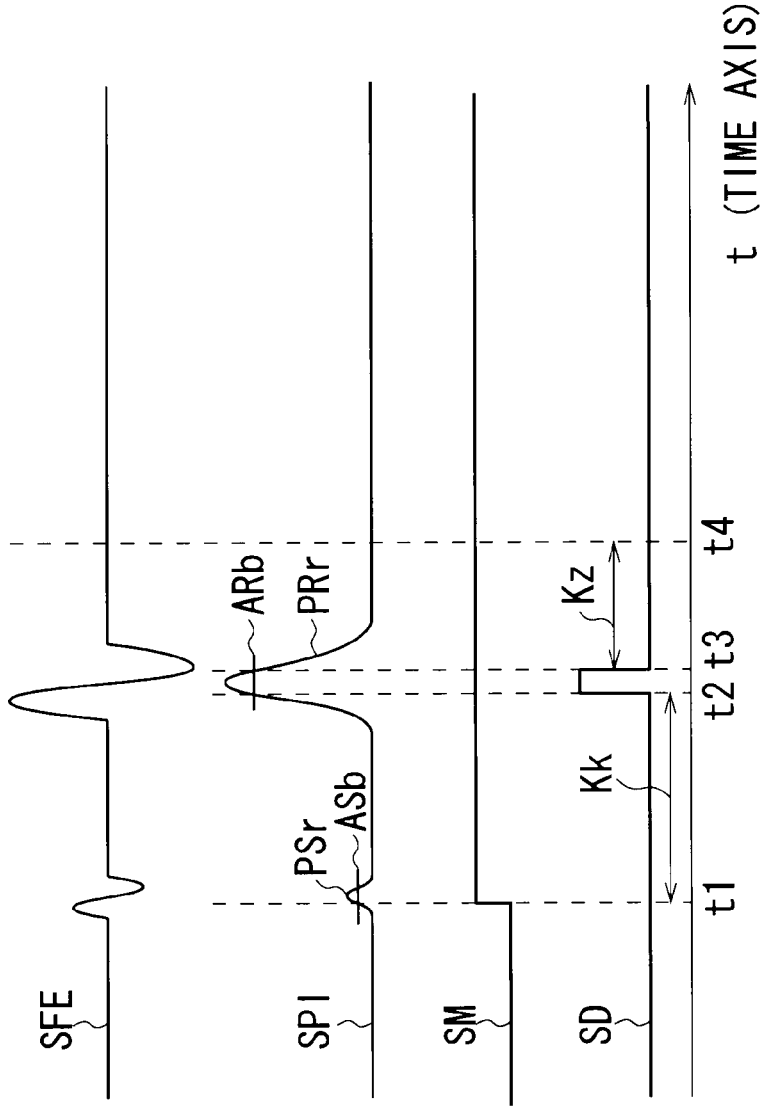

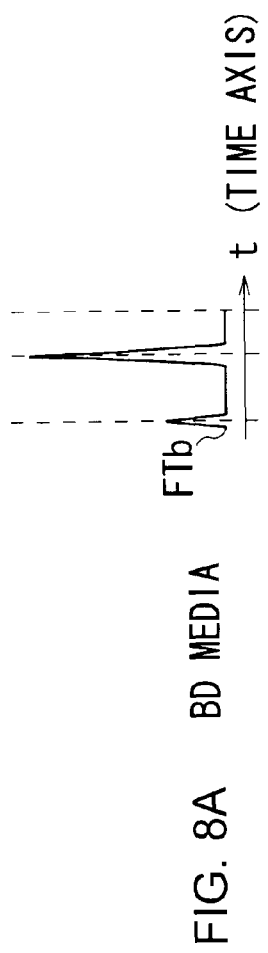
FIG. 8A  BD MEDIA
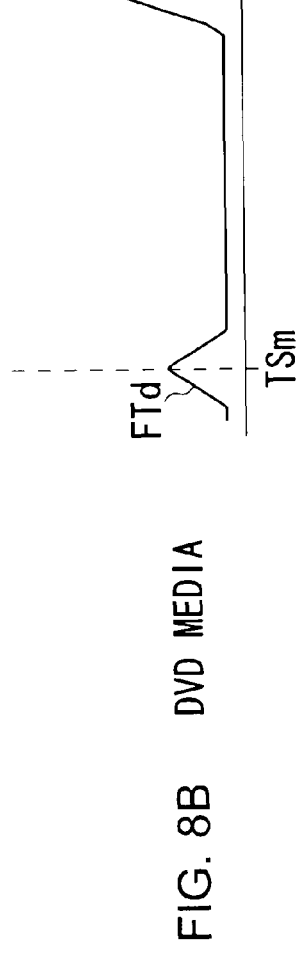
FIG. 8B  DVD MEDIA
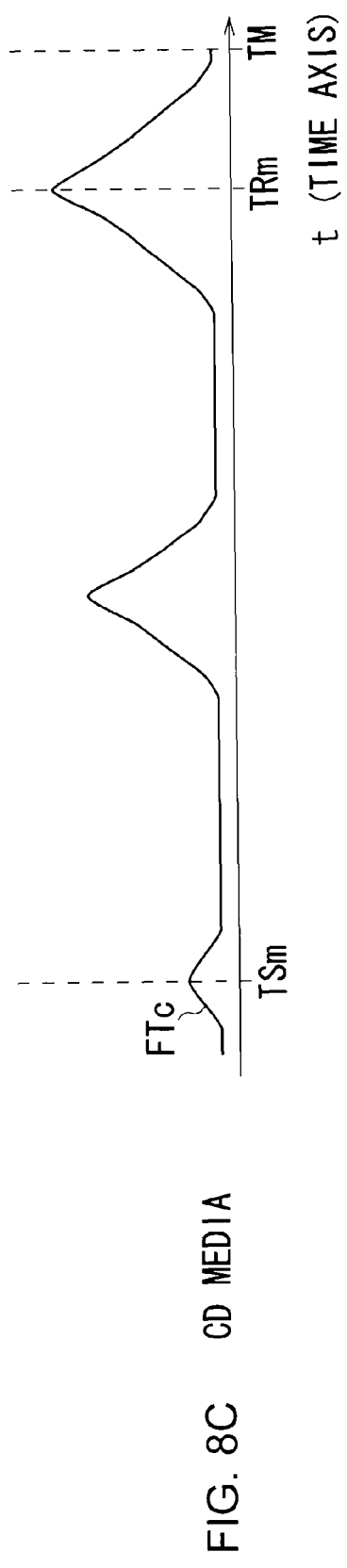
FIG. 8C  CD MEDIA

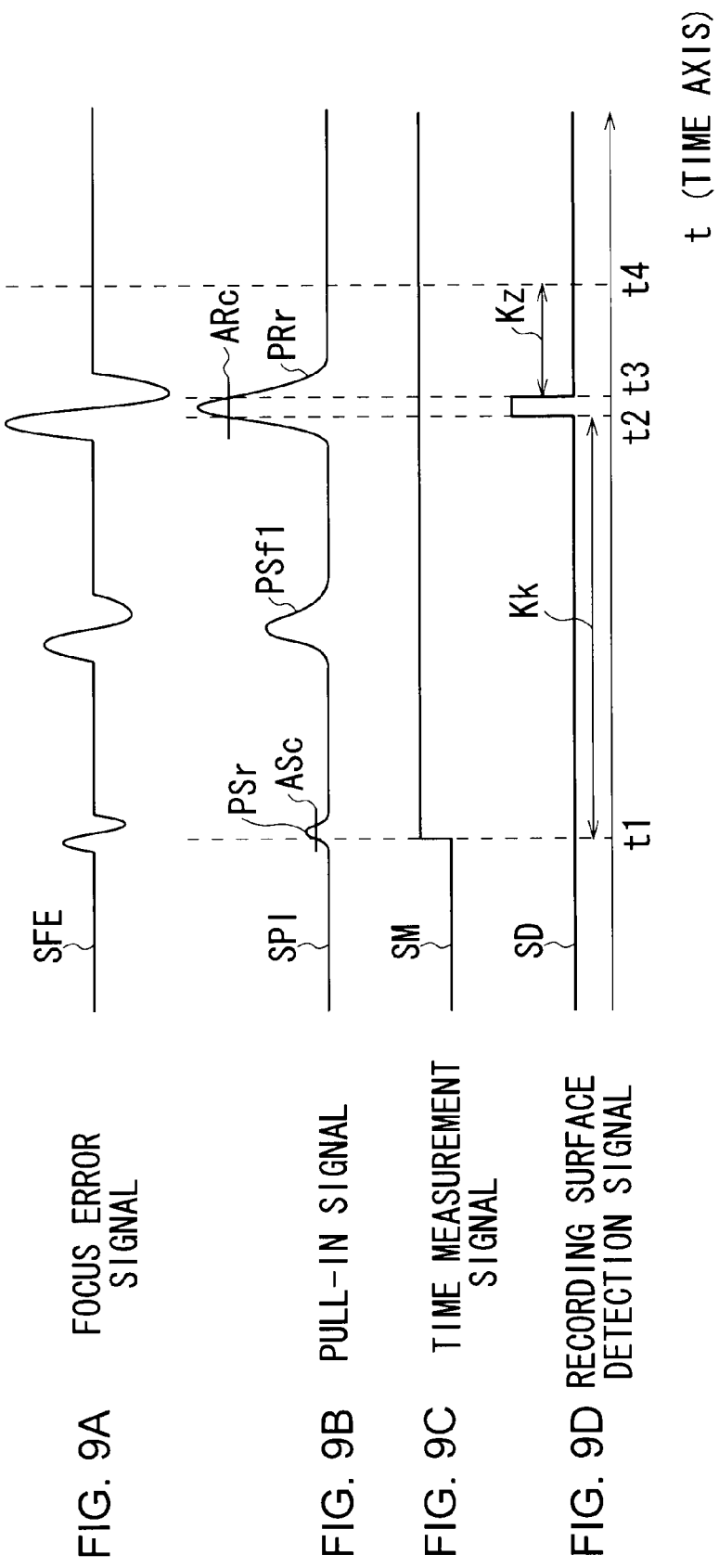

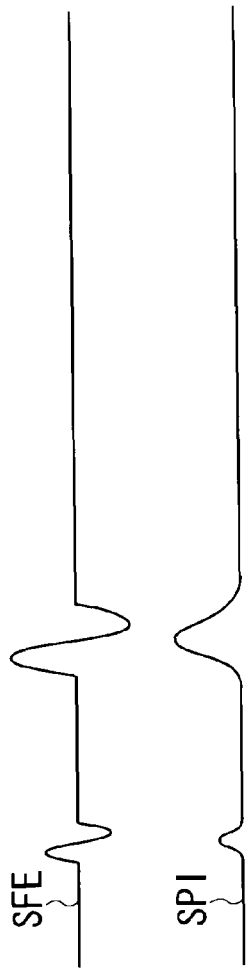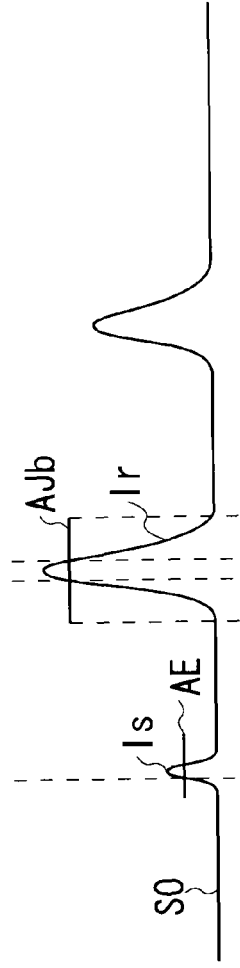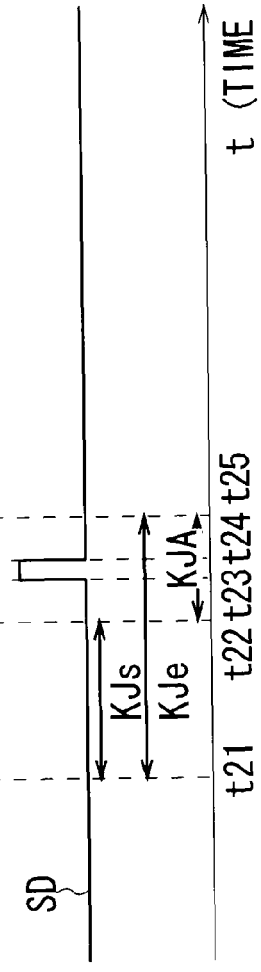
FIG. 12A  FOCUS ERROR SIGNAL
FIG. 12B  PULL-IN SIGNAL
FIG. 12C  FILTER OUTPUT SIGNAL
FIG. 12D  TIME MEASUREMENT SIGNAL
FIG. 12E  MEDIA DETERMINATION SIGNAL

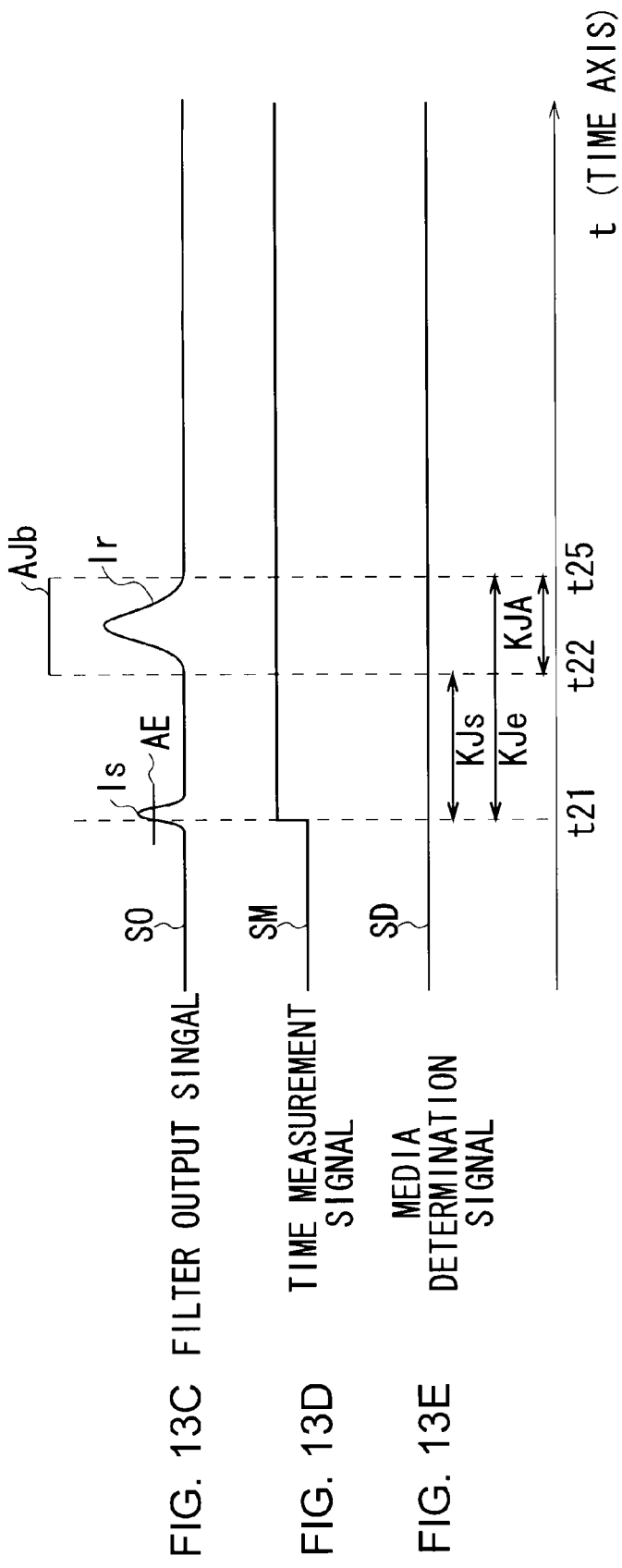
FIG. 13A  FOCUS ERROR SIGNAL
FIG. 13B  PULL-IN SIGNAL
FIG. 13C  FILTER OUTPUT SIGNAL
FIG. 13D  TIME MEASUREMENT SIGNAL
FIG. 13E  MEDIA DETERMINATION SIGNAL

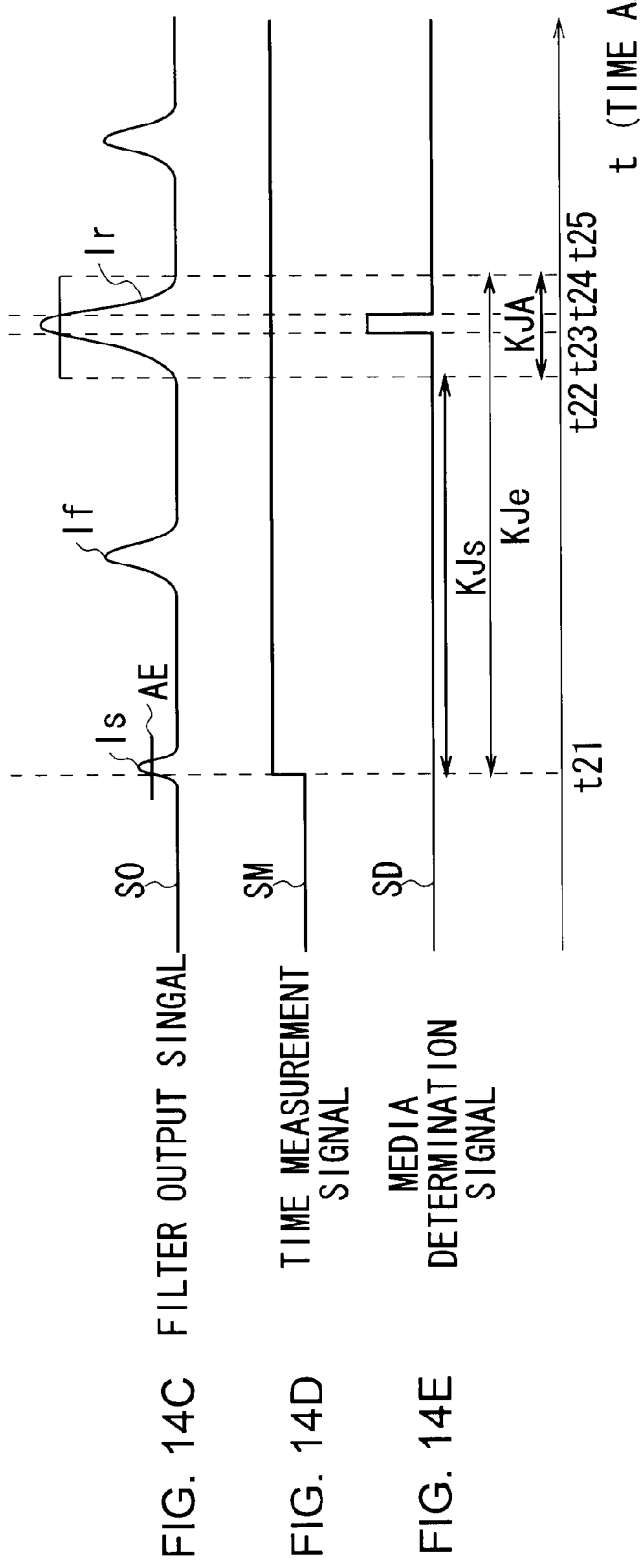

OPTICAL DISC DEVICE AND MEDIA TYPE DETERMINATION METHOD

CROSS REFERENCES TO RELATED APPLICATIONS

The present invention contains subject matter related to Japanese Patent Application JP2008-092058 filed in the Japanese Patent Office on Mar. 31, 2008, the entire contents of which being incorporated herein by reference.

BACKGROUND OF THE INVENTION

1. Field of the Invention

The present invention relates to an optical disc device and media type determination method, and is preferably applied to an optical disc device that supports a variety of optical discs, for example.

2. Description of the Related Art

Optical disc devices have been popular: such optical disc devices emit an optical beam to a recording medium, or an optical disc, in order to either record information on it or reproduce information from it.

Among those optical disc devices, there is the one that supports both Compact Disc (CD), for which an optical beam with a wavelength of about 780 nm is used, and Digital Versatile Disc (DVD), for which an optical beam with a wavelength of about 660 nm is used.

These discoid discs, CD and DVD, have the same outside diameter and thickness, about 120 mm and 1.2 mm respectively. What is different between them is the thickness of a cover layer, i.e. the distance from the surface of a disc to its signal recording surface where information is recorded: CD's is approximately 1.2 mm while DVD's is about 0.6 mm.

Moreover, the numerical aperture (NA) of an optical disc device's objective lens, through which an optical beam is emitted to an optical disc, is predetermined: the numerical apertures are 0.45 for CD and 0.6 for DVD.

Among the optical disc devices, there is the one that supports CD and DVD by using an two-focal-points objective lens having two focal points.

When an optical disc is put in it, the optical disc device, for example, recognizes the distance from the surface of the optical disc to its signal recording surface by detecting a reflection optical beam, which is the reflection of an optical beam emitted to the optical disc, makes a determination as to whether the optical disc is CD or DVD according to the distance, and appropriately focuses the optical beam on the signal recording surface. At this time, the optical disc device eliminates the elements of the reflection optical beam that are obtained from a false focal point, which is not the desired one of all the focal points (see Jpn. Pat. Laid-open Publication No. 2003-157545 [FIG. 2], for example).

SUMMARY OF THE INVENTION

By the way, a new type of optical disc, "Blu-ray Disc (Registered Trademark: referred to as BD, hereinafter)" that uses an optical beam with a wavelength of about 405 nm, has been proposed as the demand for large-capacity optical discs has been increasing. The numerical aperture of an optical lens for BD is predetermined as 0.85.

This gives rise to an idea that the objective lens of the optical disc should have three focal points in order to support not only CD and DVD but BD.

However, using such objective lenses may always cause a plurality of focal points, allowing the optical disc device to detect the reflection of an unnecessary optical beam, if its intensity is strong enough to be detected after being focused on the signal recording surface, from the false focal point.

In such cases, it is difficult for the optical disc device to distinguish the reflection of an optical beam having the desired focal point from the reflection of an unnecessary optical beam and to recognize the signal recording surface. This makes it difficult for the optical disc device to precisely recognize the type of the optical disc.

The present invention has been made in view of the above points and is intended to provide an optical disc device and media type determination method that can accurately recognize the type of the optical disc.

In one aspect of the present invention, an optical disc device includes: a first beam source that emits a first optical beam corresponding to a first optical disc; a second beam source that emits a second optical beam that corresponds to a second optical disc and whose wavelength is different from the first optical beam; an objective lens that serves as a lens having a first numerical aperture when the first optical beam converges on a signal recording surface of the first optical disc while serving as a lens having a second numerical aperture when the second optical beam converges on a signal recording surface of the second optical disc; a drive section that drives the objective lens in a focus direction along which the objective lens moves close to or away from the optical disc; a signal processing section that generates a reflection optical signal based on the intensity of a reflection optical beam that is the first or second optical beam reflected by the first or second optical disc; a storage section that stores a first disc waveform representing the waveform of the reflection optical signal obtained when the first optical beam is emitted to the first optical disc while the objective lens is moved in the focus direction; a type determination section that makes a determination as to whether an unknown disc, whose type is unknown, is the first optical disc based on a degree of matching between the first disc waveform and a first unknown disc waveform representing the waveform of the reflection optical signal obtained when the first optical beam is emitted to the unknown disc while the objective lens is moved in the focus direction.

Accordingly, regardless of whether or not there is a fake pattern that might emerge due to a nonuse beam focused on the surface or signal recording surface of the optical disc, the device can accurately recognize whether the unknown disc is the first optical disc.

In another aspect of the present invention, a media type determination method for an optical disc device including an objective lens that serves as a lens having a first numerical aperture when a first optical beam corresponding to a first optical disc converges on a signal recording surface of the first optical disc while serving as a lens having a second numerical aperture when a second optical beam that corresponds to a second optical disc and whose wavelength is different from that of the first optical beam converges on a signal recording surface of the second optical disc, the method comprising: a drive step of driving the objective lens in a focus direction along which the objective lens moves close to or away from the optical disc; a signal processing step of generating a reflection optical signal based on the intensity of a reflection optical beam that is the first or second optical beam reflected by the first or second optical disc; and a type determination step of making a determination as to whether an unknown disc, whose type is unknown, is the first optical disc based on a degree of matching between the first disc waveform representing the waveform of the reflection optical signal obtained when the first optical beam is emitted to the first optical disc while the objective lens is moved in the focus direction, and a first unknown disc waveform representing the waveform of the reflection optical signal obtained when the first optical beam is emitted to the unknown disc while the objective lens is moved in the focus direction.

Accordingly, regardless of whether or not there is a fake pattern that might emerge due to a nonuse beam focused on the surface or signal recording surface of the optical disc, the method can accurately recognize whether the unknown disc is the first optical disc.

Therefore, regardless of whether or not there is a fake pattern that might emerge due to a nonuse beam focused on the surface or signal recording surface of the optical disc, the device and the method can accurately recognize whether the unknown disc is the first optical disc. Thus, the optical disc device and media type determination method capable of accurately recognizing the type of the optical disc can be realized.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 7A to 7D are schematic diagrams illustrating the setting of a BD determination matched filter;

FIGS. 8A to 8C are schematic diagrams illustrating a filter waveform of each medium;

FIGS. 9A to 9D are schematic diagrams illustrating the setting of a CD determination matched filter;

FIGS. 12A to 12E are schematic diagrams concerning a determination as to whether it is a BD medium (1);

FIGS. 13A to 13E are schematic diagrams concerning a determination as to whether it is a BD medium (2);

FIGS. 14A to 14E are schematic diagrams concerning a determination as to whether it is a CD medium;

DETAILED DESCRIPTION OF PREFERRED EMBODIMENTS

An embodiment of the present invention will be described in detail with reference to the accompanying drawings.

(1) Configuration of an Optical Disc Device

Figure 1:
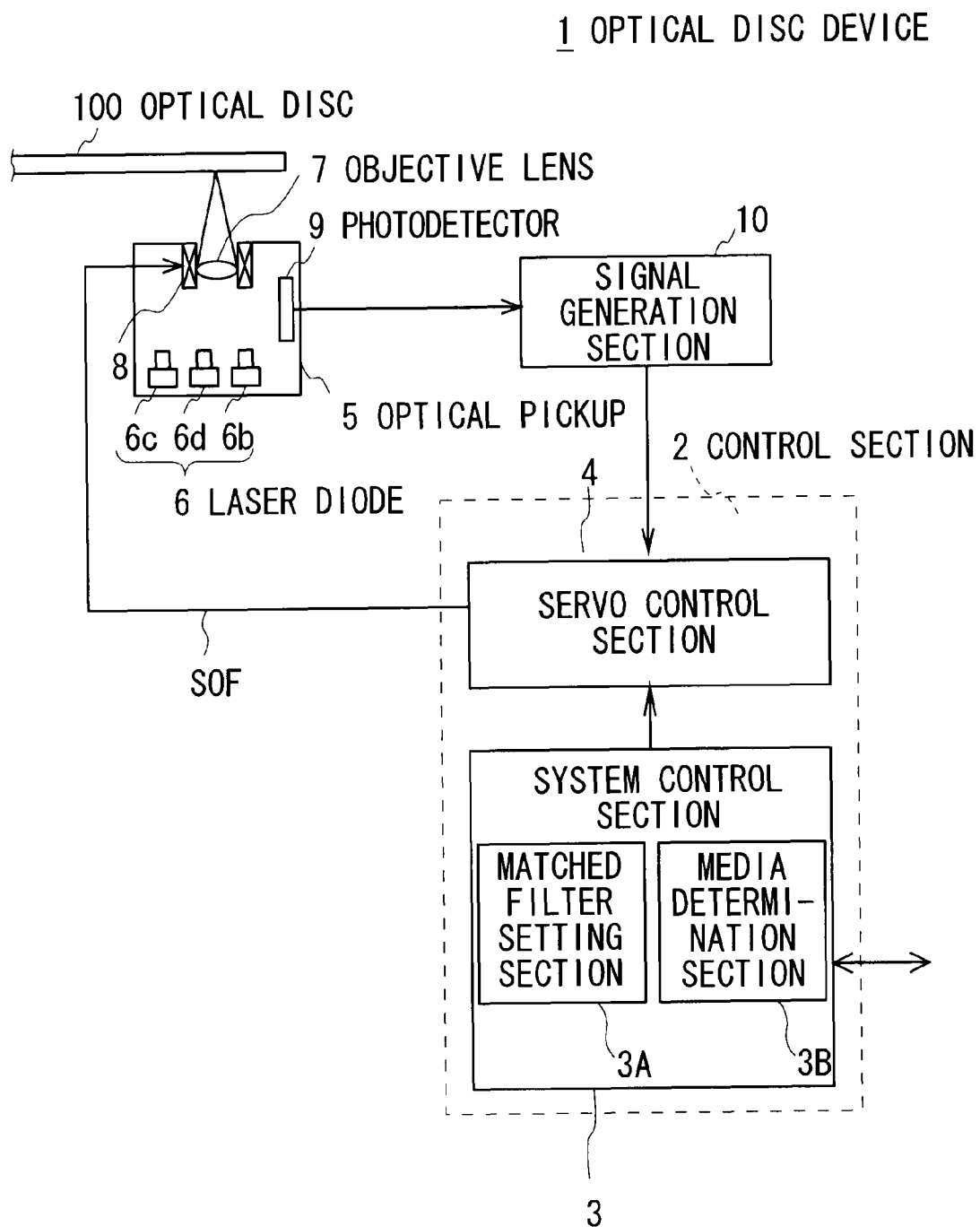
FIG. 1 is a schematic diagram illustrating the configuration of an optical disc device.

In FIG. 1, in accordance with an instruction from an external device (not shown), an optical disc device 1 records information on an optical disc 100, which is a optical recording medium, and reproduces the information from the optical disc 100.

The optical disc device 1 supports three types of optical discs 100: Compact Disc (CD), Digital Versatile Disc (DVD), and "Blu-ray Disc (Registered Trademark: referred to as BD)." For ease of explanation, these media are referred to as a CD medium 100c, a DVD medium 100d, and a BD medium 100b, hereinafter.

Incidentally, these discoid discs, a CD medium 100c, a DVD medium 100d, and a BD medium 100b, have the same outside diameter and thickness, about 120 mm and 1.2 mm respectively. However, what is different between them is: the wavelength of an optical beam used for the recording and reproducing of information, the numerical aperture of an objective lens where the optical beam converges, the distance from the surface that receives the optical beam to its signal recording surface on which the information is recorded (the thickness of a cover layer).

Specifically, the wavelengths of the optical beams are: approximately 780 nm for CD, about 660 nm for DVD, and about 405 nm for BD. The numerical apertures of objective lens are: about 0.45, 0.6, and 0.8, respectively. The thickness of the cover layers are: about 1.2 mm, 0.6 mm, and 0.1 mm, respectively.

On the other hand, the optical disc device 1 has a control section 2 whose system control section 3 takes overall control of the optical disc device 1. The system control section 3 includes Central Processing Unit (CPU: not shown) as a main component: CPU reads out from Read Only Memory (ROM: not shown) various programs including a basic program, a waveform setting program, and a media type determination program, and loads them onto Random Access Memory (RAM: not shown) in order to perform various processes including a filter waveform setting process and a media type determination process.

For example, with the optical disc 100 set in the optical disc device 1, the optical disc device 1 reads out the information from the optical disc 100 after receiving a reproduction instruction from an external device (not shown).

More specifically, a servo control section 4 receives an instruction from the system control section 3, and controls, or drives, a spindle motor (not shown) to rotate the optical disc 100. At the same time, the servo control section 4 lets an optical pickup 5 emit an optical beam to the optical disc 100.

This optical pickup 5 supports the three kinds of wavelength: it is equipped with a CD laser diode 6c emitting a CD optical beam Lc with a wavelength of about 780 nm, a DVD laser diode 6d emitting a DVD optical beam Ld with a wavelength of about 660 nm, and a BD laser diode 6b emitting a BD optical beam Lb with a wavelength of about 405 nm (these laser diodes are collectively referred to as laser diodes 6, hereinafter).

According to which type of the optical disc 100 is used (i.e. the CD medium 100c, the DVD medium 100d, or the BD medium 100b), the optical pickup 5 lets the laser diodes 6 emit an appropriate optical beam. If the optical disc 100 is the BD medium 100b, the optical pickup 5 lets the BD laser diode 6b emit the BD optical beam Lb. After that, in the optical pickup 5, the optical beam passes through optical components (not shown) and converges in an optical lens 7.

The optical lens 7 is driven by an actuator 8 to move close to or away from the optical disc 100 along an optical axis of the optical beam (i.e. the focus direction). This allows the objective lens 7 to follow the optical disc 100 even when problems, such as the axial run-out of the rotating optical disc 100, happen.

Moreover, the objective lens 7 is a combination of a plurality of optical components (not shown), serving as a wavelength-selective multifocal lens, which allows the laser beams with different wavelengths to form their focal points at the same time. Furthermore, as for the objective lens 7, there is a possibility that when a wavelength with low aperture is used for wavelength selection, unnecessary beams (referred to as nonuse beams, hereinafter) may cause a plurality of focal points due to the limitation on aperture or the change of an optical path by diffraction. Incidentally, a focal point at a wrong position is referred to as a converging beam point, hereinafter.

Actually, the objective lens 7 causes the CD optical beam Lc to converge with the numerical aperture of about 0.45, the DVD optical beam Ld with the numerical aperture of about 0.6, and the BD optical beam Lb with the numerical aperture of about 0.85. On the other hand, the objective lens 7 also lets the nonuse beams U to converge at a plurality of converging beam points.

After a reflection optical beam, which is the reflection of an optical beam from the optical disc 100, enters the objective lens 7, the optical pickup 5 leads it to a photodetector 9 via optical components (not shown).

The photodetector 9 has a surface which receives the reflection optical beam: there is a plurality of detection areas on the surface. Each detection area converts the beam into electric signals (or received-beam signals), and supplies them to a signal generation section 10.

The signal generation section 10 performs a predetermined arithmetic process for the received-beam signals, producing signals including: a pull-in signal SPI, which represents the intensity of the reflection optical beam, a focus error signal SFE, which represents a distance between the focal point of an optical beam and the signal recording surface of the optical disc 100, and a reproduction RF signal SRF, which represents the information recorded on the optical disc 100. The signal generation section 10 supplies them to the control section 2.

Based on the focus error signal SFE, the servo control section 4 of the control section 2 supplies a focus drive signal SOF to the actuator 8 so that the value of the focus error signal SFE becomes close to zero. This moves the objective lens 7 in the focus direction, pushing the focal point of the optical beam toward the signal recording surface of the optical disc 100.

This means that the servo control section 4 performs a feedback control process of the objective lens 7 in the focus direction using the actuator 8, letting the focal point of the optical beam follow the signal recording surface of the optical disc 100.

Moreover, the control section 2 let a signal processing section (not shown) perform such processes as demodulation and decoding for the reproduction RF signal SRF, in order to reproduce the information recorded on the optical disc 100. The control section 2 then transmits the information to an external device (not shown).

Furthermore, with the optical disc 100 put in the optical disc device 1, the optical disc device 1 records information on the optical disc 100 after receiving a recording instruction and data, which are to be recorded, and the like from an external device (not shown).

In a similar way to when reproducing information from the optical disc 100, the servo control section 4 performs a feedback control process of the objective lens 7 using the actuator 8, letting the focal point of the optical beam follow the signal recording surface of the optical disc 100.

In this manner, the optical disc device 1 emits the optical beam to the optical disc 100 and performs a focus control process, or the feedback control process of the objective lens 7 in the focus direction according to the detection result of the reflection optical beam. As a result, the focal point of the optical beam follows the signal recording surface of the optical disc 100.

(2) Media Type Determination of the Optical Discs (2-1) Generation of a Fake Pattern By the way, as described above, what is different between those types of optical discs 100 is thickness of the cover layers and the wavelengths of the optical beams used for recording and reproducing.

According to the type of the optical disc 100, the optical disc device 1 chooses the CD laser diode 6c, the DVD laser diode 6d, or the BD laser diode 6b to emit an optical beam with an appropriate wavelength, and adjusts the position of the focal point of the optical beam in the focus direction (that is, it adjusts the position of the objective lens 7 in the focus direction).

After the optical disc 100 is put in the optical disc device 1, the optical disc device 1 makes a determination as to which type the optical disc 100 is.

Specifically, the optical disc device 1 emits an optical beam to the optical disc 100 while moving the objective lens 7 in the focus direction at a predetermined motion speed, and, at the same time, observes the pull-in signal SPI, which represents the total intensity of the reflection optical beam (this series of processes is referred to as a search operation, hereinafter). Therefore, the optical disc device 1 detects the reflection optical beam from the surface of the optical disc 100 (referred to as a disc surface, hereinafter) as a surface reflection pattern PSr, and the reflection optical beam from the signal recording surface as a recording surface reflection pattern PRr.

Figure 2A:
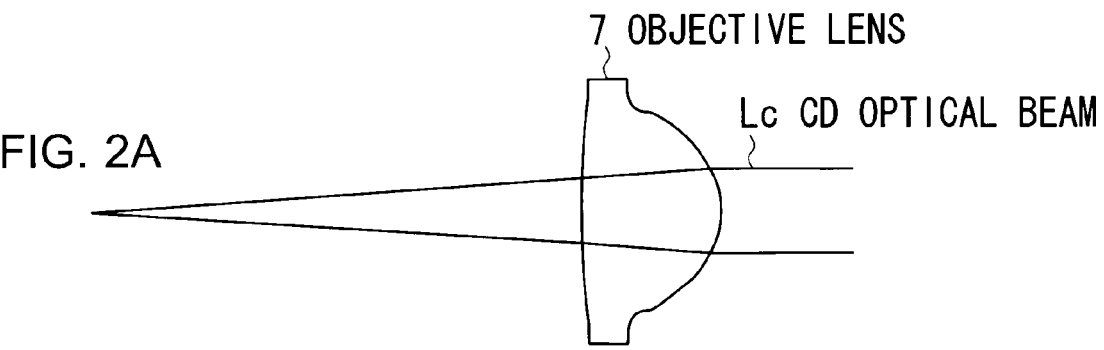
FIGS. 2A to 2C are schematic diagrams illustrating the correlation between an optical beam and a focal-point position.
Figure 2B:
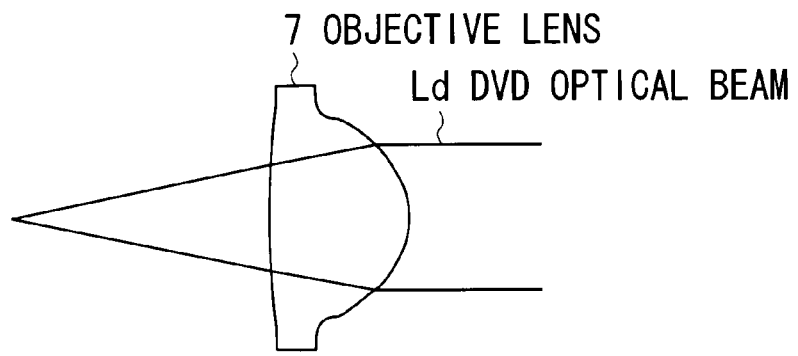
Figure 2C:
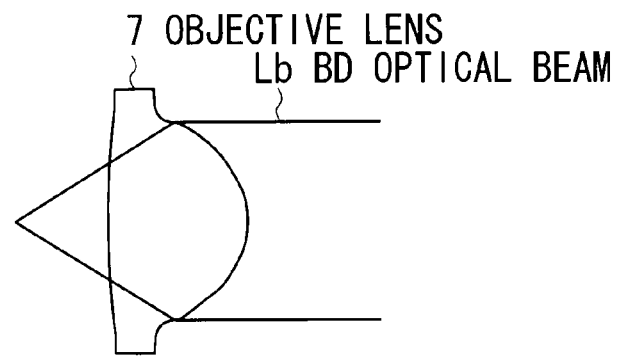

By the way, in order to support the above three types of the optical discs 100, the optical disc device 1 is equipped with the objective lens 7, which serves as the wavelength-selective multifocal lens. As shown in FIG. 2, using the objective lens 7 causes a plurality of focal points; when receiving an optical beam whose wavelength corresponds to the type of the optical disc 100, the objective lens 7 is designed to provide a numerical aperture that corresponds to this optical disc 100.

Figure 3:
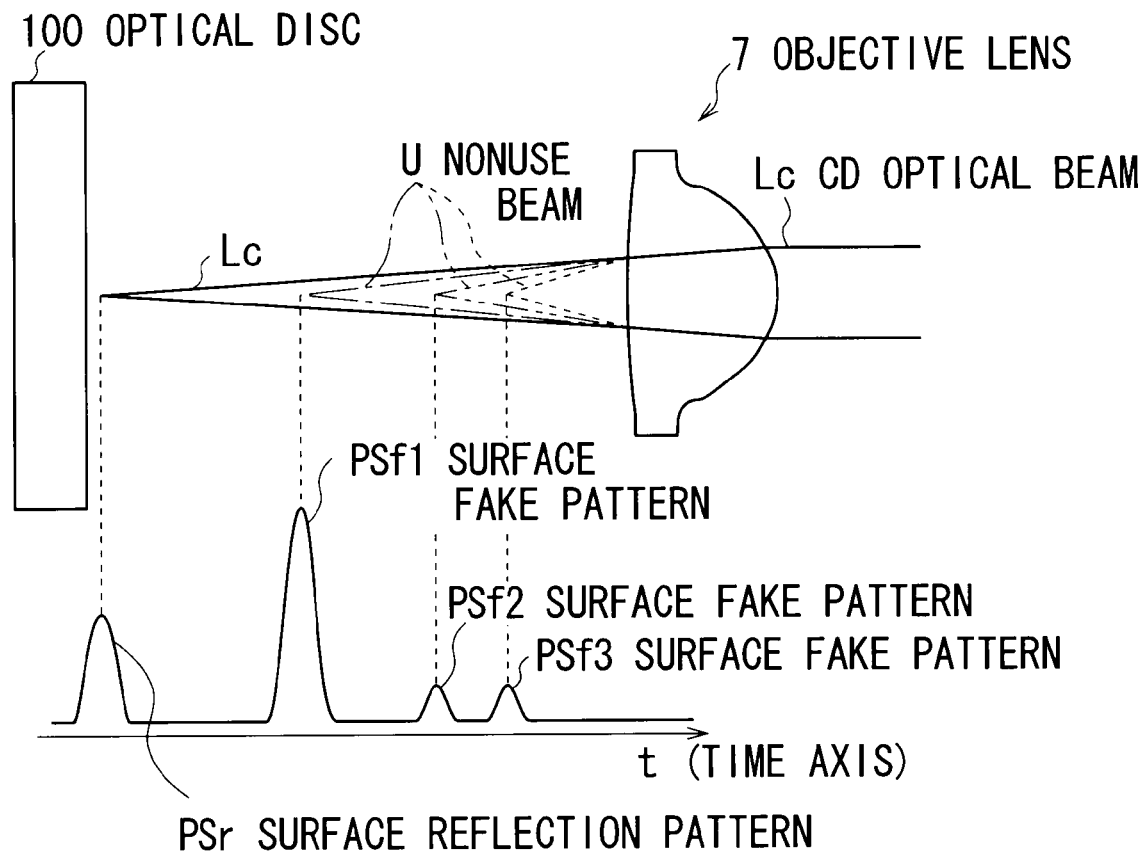
FIG. 3 is a schematic diagram illustrating the generation of a fake signal.

Moreover, as shown in FIG. 3, the objective lens 7 receiving the optical beam serves as the wavelength-selective multifocal lens. Accordingly, the nonuse beams, which are generated due to the limitation on aperture or the change of the optical path by diffraction, produce the converging beam points at wrong positions, as opposed to the position of the focal points corresponding to the wavelengths of the optical beams.

The optical disc device 1 does not use the nonuse beams U having the converging beam points at wrong positions. Since the focal points of the nonuse beams U are far away from the optical disc 100, they may interrupt the information reproducing process and the information recording process.

However, since a media type determination process of the optical disc device 1 emits an optical beam to the optical disc 100 while moving the objective lens 7 in the focus direction and detects the disc surface and the signal recording surface, the nonuse beam U can be focused on the optical disc 100.

Figure 4:
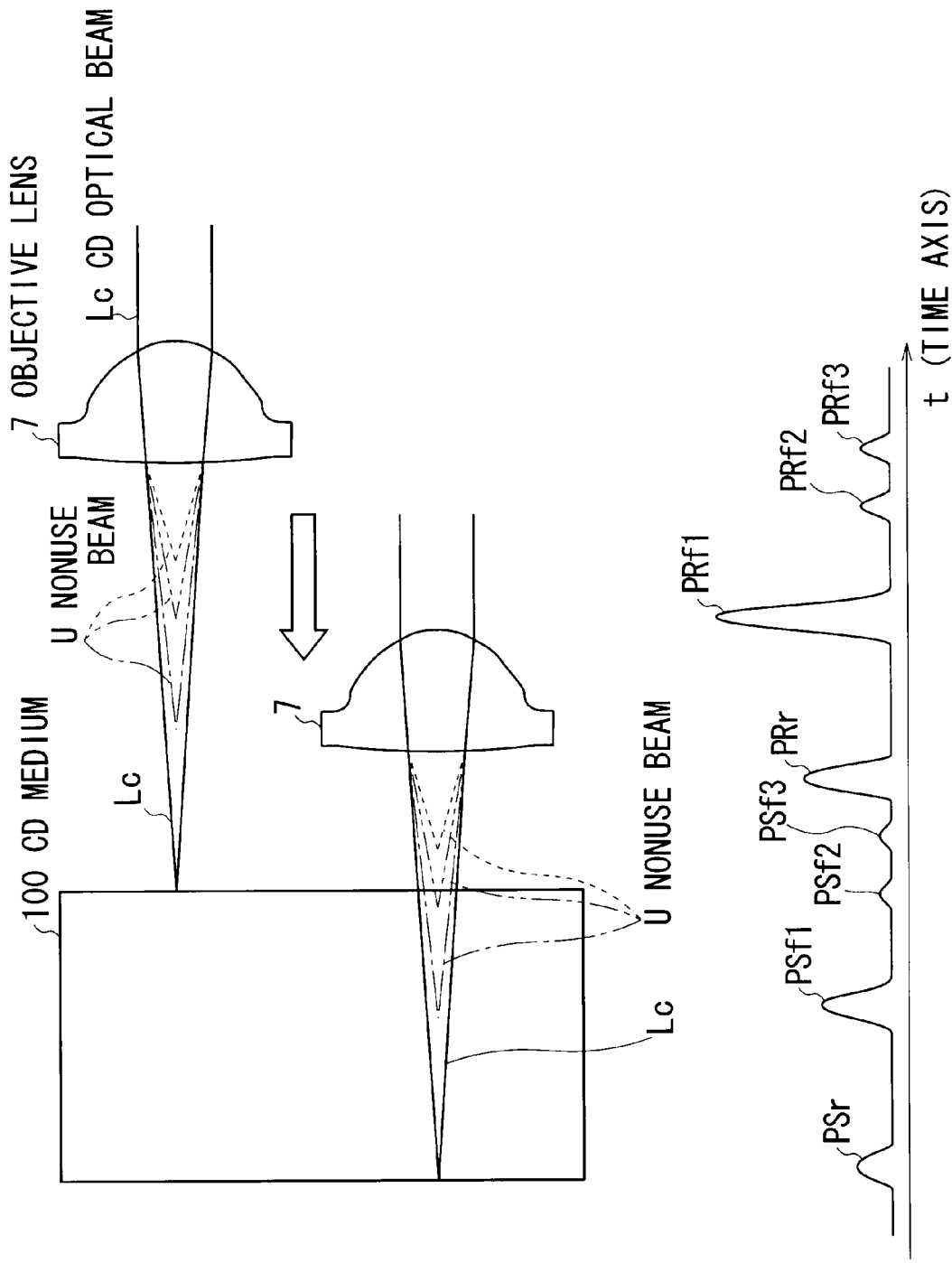
FIGS. 4A and 4B are schematic diagrams illustrating a case in which a CD optical beam is emitted to a CD medium.

That is, as shown in FIG. 4A, for example, if the optical disc device 1 emits the CD optical beam Lc to the CD medium 100c, the nonuse beams U, after the CD optical beam Lc is focused, may be focused on the disc surface. In this case, after detecting the surface reflection pattern PSr, the optical disc device 1 detects surface fake patterns PSf (PSf1 to PSf3).

As shown in FIG. 3, the surface fake pattern PSf1 corresponds to the position of the focal point of the DVD optical beam Ld and the BD optical beam Lb. Since its amplitude is large, this could be a problem for the media type determination process. The surface fake patterns PSf2 and PSf3 derive from optical elements which are used as the objective lens 7. Since their amplitudes are small, they may not cause any problem for the media type determination process.

As shown in FIGS. 4A and 4B, in a similar way to that of the disc surface, after focusing the CD optical beam Lc on the signal recording surface, the optical disc device 1 focuses the nonuse beam U on the signal recording surface. Therefore, after detecting the recording surface reflection pattern PRr, the optical disc device 1 detects recording surface fake patterns PRf (PRf1 to PRf3). Incidentally, the recording surface fake patterns PRf are detected after the detection of the recording surface reflection pattern PRr; therefore, they may not cause any problem for the media type determination process.

By the way, the objective lens 7 needs to change its numerical aperture from 0.45 for the CD medium 100c to 0.85 for the BD medium 100b. Accordingly, the efficiency for light utilization tends to decline due to the limitation on aperture.

For example, as for the objective lens 7, the efficiency for light utilization is set about 12 percent for the CD optical beam Lc, about 30 percent for the DVD optical beam Ld, and about 65 percent for the BD optical beam Lb: the efficiency is at the lowest level for the CD optical beam Lc.

This means that about 88 percent of the CD optical beam Lc entering the objective lens 7 is to be the nonuse beam when the CD optical beam Lc is emitted to the optical disc 100. Accordingly, the emission of the CD optical beam Lc to the optical disc 100 entails an increase in amplitude of the surface fake patterns PSf and recording surface fake patterns PRf (those fake patterns are collectively referred to as fake patterns Pf, hereinafter) of the pull-in signal SPI, compared with the emission of other optical beams.

Figure 5:
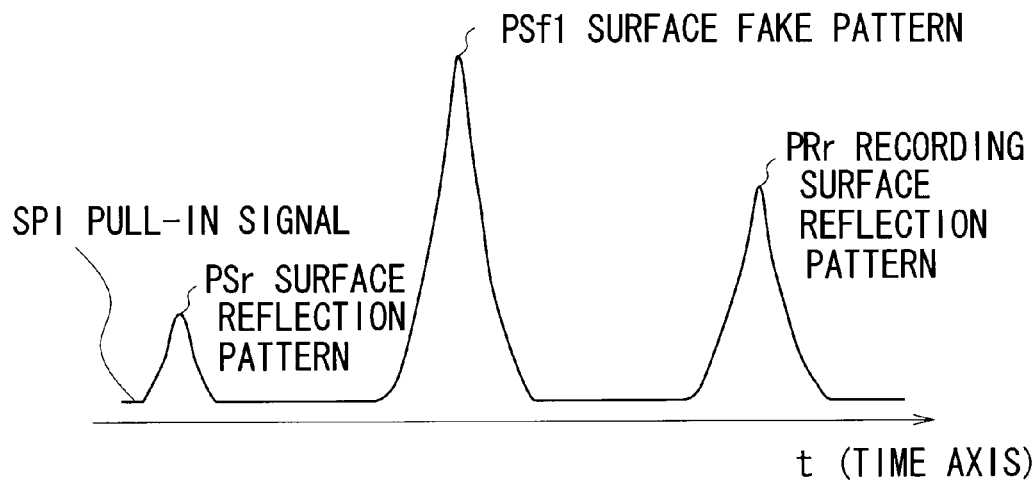
FIG. 5 is a schematic diagram illustrating a case of a low-reflectance CD medium.

FIG. 5 shows the pull-in signal obtained as a result of emitting the CD optical beam Lc to the low-reflectance CD medium 100c including CD-RW (Re-writable). In this case, the amplitude of the recording surface reflection pattern PRr is smaller than that of FIG. 4B; the amplitude of the surface fake pattern PSf1 is therefore larger than that of the recording surface reflection pattern PRr.

Accordingly, a typical optical disc device, such as the one that detects the pull-in signal SPI whose signal level is greater than or equal to a predetermined detection threshold as the recording surface reflection pattern PRr and determines the type of the optical disc 100 based on the difference in time between the detection of the surface reflection pattern PSr and the detection of recording surface reflection pattern PRr, may detect the surface fake pattern PSf1 as the recording surface reflection pattern PRr and therefore fail to recognize the type of the optical disc 100 appropriately.

Accordingly, the optical disc device 1 of the present embodiment previously performs an actual search operation using the already-known type of the optical disc 100, generates the pull-in signal SPI from this optical disc 100, and sets the waveform (referred to as a filter waveform, hereinafter) FT of the pull-in signal SPI in a matched filter of a media determination section 3B (FIG. 1). During a media determination process, the optical disc device 1 makes a determination as to which type an unknown optical disc 100 (referred to as an unknown disc 100x, hereinafter) is according to how much the waveform of the pull-in signal SPI generated from the unknown disc 100 resembles the filter waveform.

(2-2) Setting of the Filter Waveform

Figure 6:
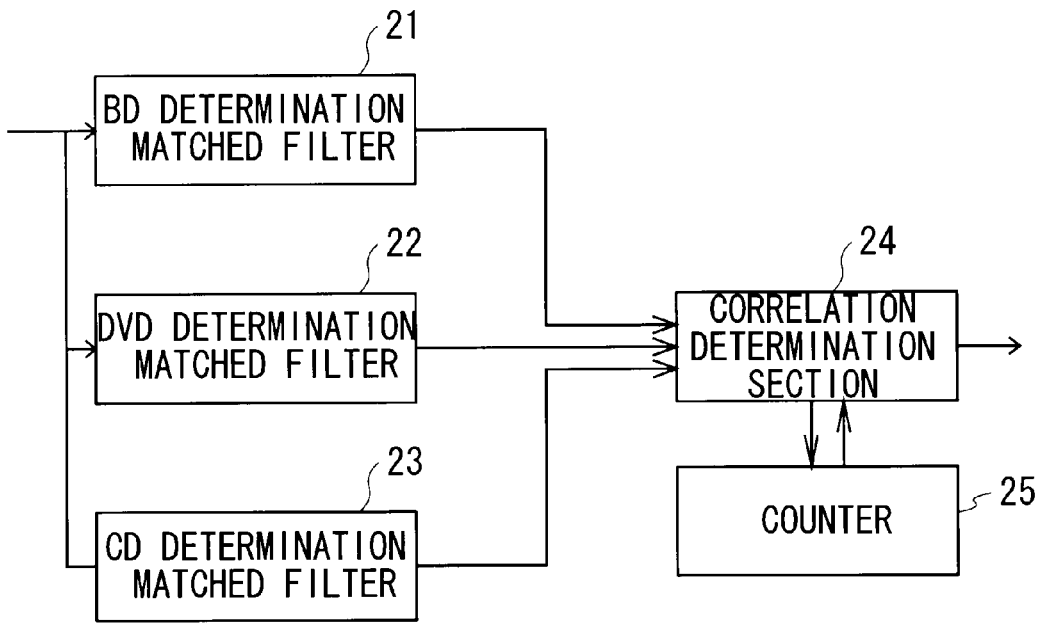
FIG. 6 is a schematic diagram illustrating the configuration of a media determination section.

Before being shipped from a factory, for example, the optical disc device 1 performs a filter setting process to generate the filter waveform FT from the already-known type of the optical disc 100 and set it. As shown in FIG. 6, during the filter setting process, the optical disc device 1 first sets a filter waveform (referred to as a BD filter waveform) FTb generated from the BD medium 100b in a BD determination matched filter 21 of the media determination section 3B.

Then, the optical disc device 1 sets a filter waveform (referred to as a DVD filter waveform) FTd generated from the DVD medium 100d in a DVD determination matched filter 22. Moreover, the optical disc device 1 sets a filter waveform (referred to as a CD filter waveform) FTc generated from the CD medium 100c in a CD determination matched filter 23.

More specifically, the system control section 3 (FIG. 1) of the optical disc device 1 starts a filter waveform setting process after receiving an instruction from an external device, for example. The system control section 3 then requests a user to put the BD medium 100b in the optical disc device 1 through a display device (not shown). After the BD medium 100b is put in the optical disc device 1, a matched filter setting section 3A starts the setting of the BD filter waveform FTb.

The matched filter setting section 3A controls the BD laser diode 6b to emit the BD optical beam Lb and causes the BD optical beam Lb to converge so that the numerical aperture of the objective lens 7 becomes about 0.85.

Moreover, the matched filter setting section 3A controls, or drives, the actuator 8 through the servo control section 4 to moves the objective lens 7, which is away from the optical disc 100, toward the optical disc 100 at a constant speed. At the same time, the matched filter setting section 3A gets the pull-in signal SPI to observe the change of the pull-in signal SPI.

As shown in FIG. 7, the matched filter setting section 3A assumes that the surface reflection pattern PSr has been detected, after the pull-in signal SPI temporarily increases and exceeds a predetermined surface detection threshold ASb at time instant t1.

At this time, the matched filter setting section 3A raises a time measurement signal SM from low level to high level: the time measurement signal SF is used to measure the time required to move the focal point, or the objective lens 7. A counter (not shown) therefore starts to measure the time.

Then, the matched filter setting section 3A assumes that the recording surface fake patterns PRf has been detected, after the pull-in signal SPI temporarily increases and exceeds a predetermined recording surface detection threshold ARb at time instant t2. The matched filter setting section 3A therefore raises a recording surface detection signal SD from low level to high level temporarily: the recording surface detection signal SD is used to indicate the detection of the signal recording surface.

At this time, the matched filter setting section 3A calculates a detection time difference, or the difference in time from time instant t1 when the disk surface was detected to time instant t2 when the signal recording surface was detected, and temporarily stores the detection time difference in RAM as a detection time Kk. After that, the matched filter setting section 3A lowers the recording surface detection signal SD, which indicates the detection of the signal recording surface, after the pull-in signal SPI becomes less than the recording surface detection threshold ARb at time instant t3. After a predetermined measurement extra time Kz has passed since the time instant t3, the matched filter setting section 3A at time instant t4 ends the search operation.

Then, the matched filter setting section 3A subtracts a predetermined before-and-after time from the detection time Kk to calculate a determination start time KJs (described later), and adds the before-and-after time and the detection time Kk to calculate a determination end time KJe (described later). The matched filter setting section 3A stores the determination start time KJs and the determination end time KJe in ROM.

Moreover, the matched filter setting section 3A generates an amplified PI signal by amplifying the pull-in signal SPI so that the maximum amplitude of the pull-in signal SPI (or the peak point of the recording surface reflection pattern PRr) becomes a predetermined signal level. The matched filter setting section 3A also generates an adjusted amplified PI signal by dropping a pattern whose signal level of the maximum value is less than a predetermined dropping threshold from the patterns that appear in the amplified PI signal.

Then, the matched filter setting section 3A extracts the adjusted amplified PI signal's signal level at a predetermined interval, and stores the extracted signal levels in ROM as filter values. Incidentally, FIG. 8A shows the BD filter waveform FTb, which the filter value (referred to as a BD filter value, hereinafter) generated from the real BD medium 100b represents.

In this manner, the matched filter setting section 3A stores the BD filter value in ROM (not shown). Accordingly, the BD filter waveform FTb, which represents the waveform of the pull-in signal SPI generated from the real BD medium 100b, is set in the BD determination matched filter 21; the calculated determination start time KJs and determination end time KJe are stored in ROM.

In a similar way to the case of the BD medium 100b (except that it uses the DVD optical beam Ld), the matched filter setting section 3A generates a filter value (referred to as a DVD filter value) with the DVD medium 100d put in the optical disc device 1. Then, the matched filter setting section 3A stores the DVD filter value in ROM; a DVD filter waveform FTd is therefore set in the DVD determination matched filter 22; the determination start time KJs and determination end time KJe are stored in ROM. Incidentally, FIG. 8B shows the DVD filter waveform FTd, which the DVD filter value generated from the real DVD medium 100d represents.

In a similar way to the case of the BD medium 100b (except that it uses the CD optical beam Lc), as shown in FIG. 9, the matched filter setting section 3A generates a filter value (referred to as a CD filter value) with the CD medium 100c put in the optical disc device 1. Then, the matched filter setting section 3A stores the CD filter value in ROM; a CD filter waveform FTc is therefore set in the CD determination matched filter 23; the determination start time KJs and determination end time KJe are stored in ROM.

FIG. 9 illustrates a case of using CD-ROM whose signal recording surface's reflectance is high: the amplitude of the recording surface reflection pattern PRr is larger than that of the fake pattern PSf1. Accordingly, the matched filter setting section 3A uses a signal level that is larger than the amplitude of the surface fake pattern PSf1 and smaller than the amplitude of the recording surface reflection pattern PRr as a recording surface detection threshold ARc.

This allows the matched filter setting section 3A to detect only the recording surface reflection pattern PRr as the signal recording surface. Incidentally, FIG. 8C shows the CD filter waveform FTc, which a filter value (referred to as a CD filter value, hereinafter) generated from the real CD medium 100c represents.

In that manner, the optical disc device 1 actually performs the search operation for the already-known media including the BD medium 100b, the DVD medium 100d and the CD medium 100c, and stores the acquired filter values representing the waveforms of the pull-in signals SPI in ROM, thereby setting in the media determination section 3B the waveforms of the pull-in signals SPI generated as a result of the search operation.

(2-3) Determination of the Media

Figures 10A, 10B:
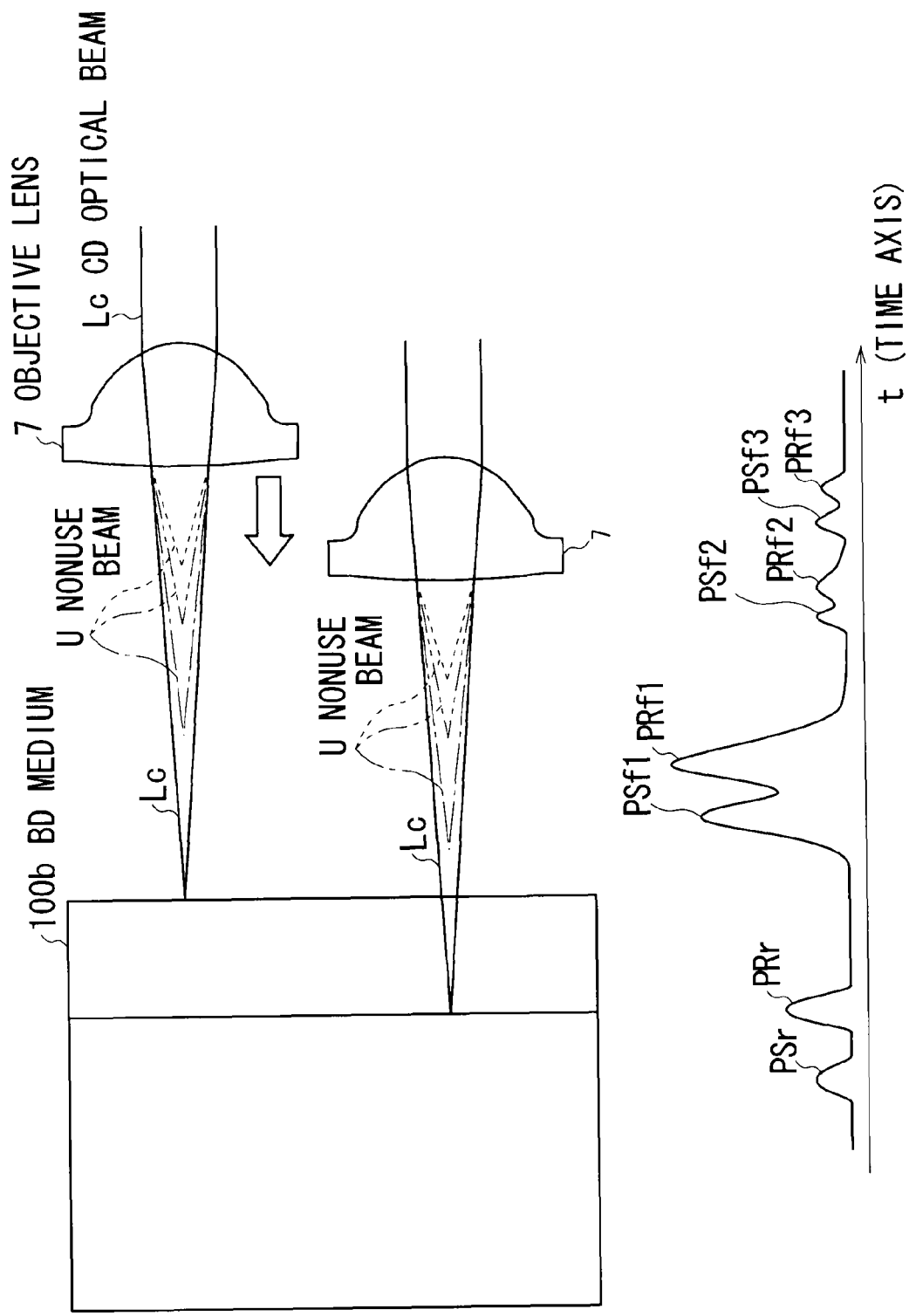
FIGS. 10A and 10B are schematic diagrams illustrating a case in which a CD optical beam is emitted to a BD medium.

By the way, as shown in FIG. 10A, the distance from the disc surface of the BD medium 100b to its signal recording surface is approximately 0.1 mm: it is smaller than that of the CD medium 100c, which is about 1.2 mm. Accordingly, as shown in FIG. 10B, if the optical disc device 1 emits the CD optical beam Lc, whose efficiency for light utilization is low, to the BD medium 100b, the signals from the disc surface are mixed up with the signals from the signal recording surface, making it difficult to recognize which type the optical disc 100 is.

On the contrary, if it uses the BD optical beam Lb whose efficiency for light utilization is higher than the CD optical beam Lc, the signal level of the fake pattern Pf becomes smaller than the surface reflection pattern PSr and recording surface reflection pattern PRr of the pull-in signal SPI because it has less nonuse beam U than the CD optical beam Lc does. Accordingly, during the search operation using the BD optical beam Lb, it is less likely for the optical disc device 1 to falsely recognize the type of the optical disc 100, because the fake pattern PF is small.

The same holds for the DVD optical beam Ld: the signal level of the fake pattern Pf is smaller compared with the surface reflection pattern PSr and recording surface reflection pattern PRr of the pull-in signal SPI because it has less nonuse beam U than the CD optical beam Lc does. Accordingly, during the search operation using the DVD optical beam Ld, it is less likely for the optical disc device 1 to falsely recognize the type of the optical disc 100, because the fake pattern PF is small.

Therefore, the optical disc device 1 first uses the most efficient optical beam in terms of light utilization for the search operation to lower the possibility that the type of the optical disc 100 will be falsely recognized, and then sequentially uses the second and third efficient ones in the course of recognizing the type of the optical disc 100.

More specifically, the optical disc device 1 first emits the BD optical beam Lb to an unknown optical disc 100x whose type is unknown, and makes a determination as to whether the optical disc 100 is the BD medium 100b. If the unknown disc 100x is not the BD medium 100b, the optical disc device 1 emits the DVD optical beam Ld to the unknown disc 100x, and makes a determination as to whether the unknown disc 100x is the DVD medium 100d.

If the unknown disc 100x is not the DVD medium 100d, the optical disc device 1 emits the CD optical beam Lc to confirm that the unknown disc 100x is really the CD medium 100c, and makes a determination as to whether the unknown disc 100x is the CD medium 100c.

In that manner, the optical disc device 1 uses the optical beams in order of decreasing light-utilization efficiency to make a determination as to whether the unknown disc 100x is the BD medium 100b, the DVD medium 100d, or the CD medium 100c. In this manner, the media type determination process is carried out to recognize the type of the unknown disc 100x.

(2-3-1) BD Determination Process and DVD Determination Process

The following describes a case where the system control section 3 of the optical disc device 1 performs a BD determination process, in which a determination is made as to whether the unknown disc 100x is the BD medium 100b, and a DVD determination process, in which a determination is made as to whether the unknown disc 100x is the DVD medium 100d. The following description uses the BD determination process as an example.

As shown in FIG. 6, the system control section 3 got the BD determination matched filter 21, the DVD determination matched filter 22, and the CD determination matched filter 23 set in the media determination section 3B. The media determination section 3B first chooses the BD determination matched filter 21 for use as a matched filter, and lets the BD laser diode 6b emit the BD optical beam Lb to cause the BD optical beam Lb to converge so that the numerical aperture of the objective lens 7 becomes approximately 0.85.

Moreover, the media determination section 3B controls, or drives, the actuator 8 through the servo control section 4 so that the objective lens 7, which is situated away from the unknown disc 100x, moves closer to the optical disc 100 at a constant motion speed.

At this time, the media determination section 3B observes the changes of the focus error signal SFE and the pull-in signal SPI, extracts the signal level from the pull-in signal SPI at the same interval as that of sampling the filter value, and supplies them to the BD determination matched filter 21 as an unknown disc waveform value.

The BD determination matched filter 21 examines how much the BD filter waveform FTb represented by the BD filter value set in the filter 21 resembles the waveform (referred to as an unknown disc waveform, hereinafter) of the pull-in signal SPI represented by the unknown disc waveform value. Then, the BD determination matched filter 21 generates a filter output signal SO representing a degree of matching between the BD filter waveform FTb and the unknown disc waveform FDx, and supplies it to a correlation determination section 24 (FIG. 6).

Specifically, the BD determination matched filter 21, following the following equation (1), calculates a convolution integral using the supplied unknown disc waveform value and the BD filter value: 【数 1】 wherein f(t) represents a function of the unknown disc waveform FDx; h(t) represents a function of the BD filter waveform FTb; g(t) represents a function of the filter output signal SO.

The BD determination matched filter 21 shifts the functions f(t) and h(t) along the time axis and multiplying them; the result is then integrated within a range of the BD filter waveform FTb; the value associated with the size of an area where the function f(t) has overlapped with the function h(t) is calculated as the function g(t).

In other words, the BD determination matched filter 21 moves the BD filter waveform FTb and the unknown disc waveform FDx and causes them to overlap with each other. The BD determination matched filter 21 then outputs the value associated with the size of an area where the BD filter waveform FTb has overlapped with the unknown disc waveform FDx as the filter output signal SO.

At this time, the BD determination matched filter 21 calculates a convolution integral from the rear side of the time axis of the BD filter value FTb (i.e. in the reverse order of when the BD filter values FTb were generated) for the unknown disc waveform values input from the front side of the time axis of the unknown disc waveform FDx (i.e. in the same order as when the unknown disc waveforms FDx were generated). This means that it first causes the unknown disc waveform FDx to overlap with the rear side of the BD filter waveform FTb, and calculates the size of the area where they overlap with each other as the filter output signal SO.

Figure 11A:
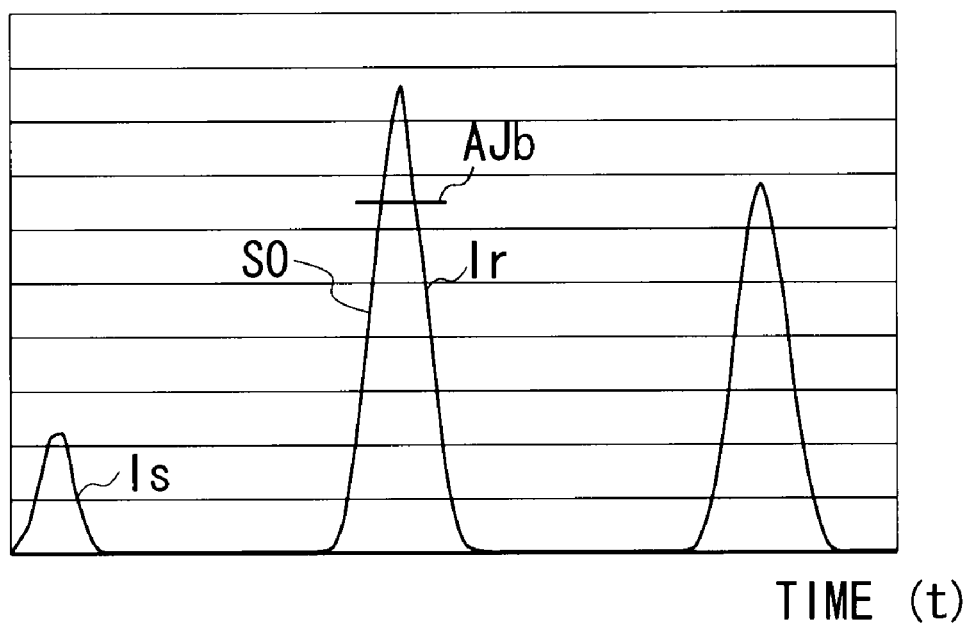
FIGS. 11A and 11B are schematic diagrams illustrating the waveform of a filter output signal during the emission of a BD optical beam.

If the unknown disc 100x is the BD medium 100b, a surface correlation pattern Is appears in the filter output signal SO as shown in FIG. 11A: the surface correlation pattern IS has a relatively small amplitude, indicating that the surface reflection pattern PSr of the unknown disc waveform FDx has overlapped with part of the recording surface reflection pattern PRr of the BD filter waveform FTb.

Then, a total correlation pattern Ir appears in the filter output signal SO: the total correlation pattern Ir has a large amplitude, indicating the degree of matching between the surface reflection pattern PSr and the recording surface reflection pattern PRr of the BD filter waveform FTb and the unknown disc waveform FDx is generally high because they mostly overlap with each other.

Figure 11B:
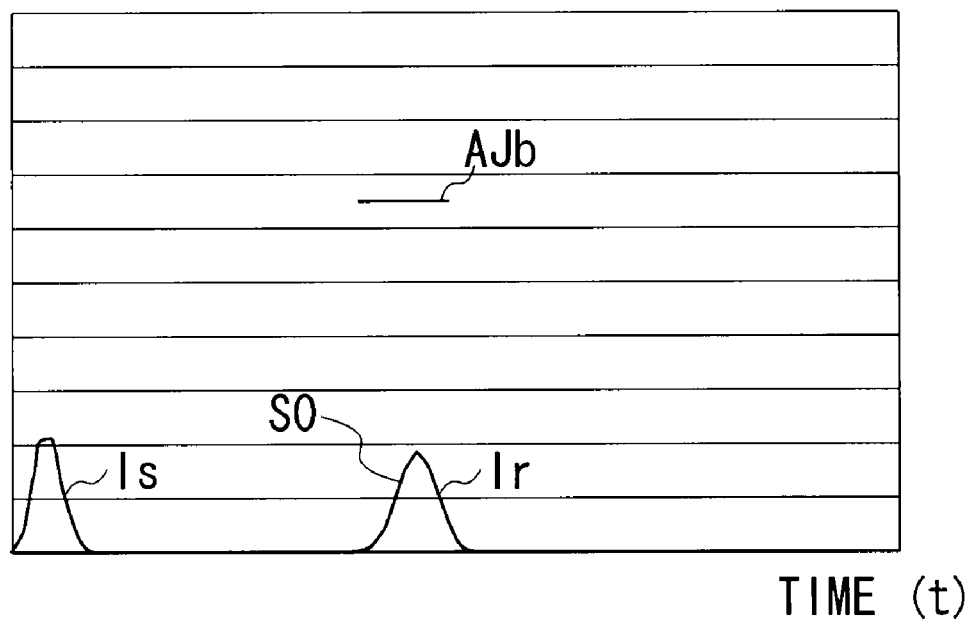

On the contrary, if the unknown disc 100x is not the BD medium 100b, a surface correlation pattern Is, like the one for the BD medium 100b, appears in the filter output signal SO as shown in FIG. 11B: the surface correlation pattern IS has a relatively small amplitude, indicating that the surface reflection pattern PSr of the unknown disc waveform FDx has overlapped with part of the recording surface reflection pattern PRr of the BD filter waveform FTb.

Then, in the filter output signal SO, the surface reflection patterns PSr of the unknown disc waveform FDx and the BD filter waveform FTb overlap with one another. At this time, there is no recording surface reflection pattern PRr for the unknown disc waveform FDx; therefore, there is no pattern that overlaps with the recording surface reflection pattern PRr of the BD filter waveform FTb. Accordingly, a total correlation pattern IR with relatively small amplitude appears in the filter output signal SO.

That is, in the filter output signal SO, the total correlation pattern Ir with large amplitude, like the one for the BD medium 100b, does not appear because the BD filter waveform FTb is completely different from the unknown disc waveform FDx. However, the total correlation pattern Ir with small amplitude appears, indicating that the surface reflection patterns PSr of the unknown disc waveform FDx has overlapped with the surface reflection patterns PSr of the BD filter waveform FTb.

Therefore, the media determination section 3B makes a determination as to whether the unknown disc 100x is the BD medium 100b according to the amplitude of the total correlation pattern Ir of the filter output signal SO.

By the way, if the detection time Kk required to detect the recording surface reflection pattern PRr of the unknown disc waveform FDx after detecting its surface reflection patterns PSr is equal to the detection time Kk for the BD filter waveform FTb, a time required to detect the total correlation pattern Ir after detecting the surface correlation pattern Is becomes equal to that detection time Kk.

Accordingly, with the surface correlation pattern Is as a reference pattern, the media determination section 3B recognizes a pattern appearing near the surface correlation pattern Is at a time when that detection time Kk has passed as the total correlation pattern Ir which totally represents the degree of matching between the BD filter waveform FTb and the unknown disc waveform FDx.

If the BD filter waveform FTb and the unknown disc waveform FDx are different from each other and they are at different positions at the time axis, a pattern with large amplitude may appear in the filter output signal SO due to an increase in the size of the area where the BD filter waveform FTb overlaps with the unknown disc waveform FDx. But even in this case, the media determination section 3B refrains from examining how much the BD filter waveform FTb resembles the unknown disc waveform FDx based on the pattern. The media determination section 3 can carry out an appropriate examination as to how much the BD filter waveform FTb resembles the unknown disc waveform FDx.

More specifically, as shown in FIG. 12, which illustrates a case in which the unknown disc 100x is the BD medium 100b, the correlation determination section 24 (FIG. 6) of the media determination section 3B starts observing the filter output signal SO after the filter output signal SO (FIG. 12C) is output. At time instant t21, when it recognizes the filter output signal SO exceeding a predetermined surface correlation threshold AE, the correlation determination section 24 assumes that the surface correlation pattern Is has been detected and ends the observation of the filter output signal SO. At the same time, the correlation determination section 24 raises the time measurement signal SM (FIG. 12D) from low level to high level and starts measuring a correlation time using a counter (FIG. 5) with the time instant t21 as a point of reference.

At time instant t22, the correlation determination section 24 recognizes that the determination start time KJs has passed since the time instant t21 when the surface correlation pattern Is was detected and then starts observing the signal level of the filter output signal SO again. At time instant t23 when the signal level of the filter output signal SO becomes greater than or equal to a total correlation threshold AJb, the correlation determination section 24 assumes that the unknown disc 100x is the BD medium 100b because of a high degree of matching between the unknown disc waveform FDx and the BD filter waveform FTb. The correlation determination section 24 therefore raises a media determination signal SD from low level to high level.

At time instant t24 when the signal level of the filter output signal SO becomes less than the total correlation threshold Ajb, the correlation determination section 24 lowers the media determination signal SD from high level to low level. Then, at time instant t25 when the determination end time KJe has passed since the time instant t21 when the surface correlation pattern Is was detected, the correlation determination section 24 ends the observation of the filter output signal SO as well as the search operation.

At this time, since it has already determined that the unknown disc 100x is the BD medium 100b, the media determination section 3B ends the media determination process.

By the way, in the filter output signal SO, another pattern appeared after the total correlation pattern Ir because the recording surface reflection pattern PRr of the filter waveform Ftb overlapped with the surface reflection pattern PSr and recording surface fake patterns PRf of the unknown disc waveform FDx. But this pattern does not cause any problem because it appeared outside a determination period KJA and because its amplitude was less than the total correlation threshold AJb.

On the contrary, as shown in FIG. 13, if the signal level of the filter output signal SO does not become greater than or equal to the total correlation threshold AJb during a period of from t22 to t25, the correlation determination section 24 quits the observation of the filter output signal SO as well as the search operation.

At this time, since the type of the unknown disc 100x still remains unknown, the media determination section 3B starts a DVD determination process: the DVD determination process makes a determination as to whether the unknown disc 100x is the DVD medium 100d.

In this manner, during the determination period KJA, the media determination section 3B makes a determination as to whether the unknown disc 100x is the BD medium 100b according to whether the amplitude of the total correlation pattern Ir becomes greater than or equal to the total correlation threshold AJb: the determination period KJA starts at time instant t22, when the determination start time KJs has passed since the time instant t21 when the surface correlation pattern Is was detected, and ends at time instant t25, when the determination end time KJe has passed since the time instant t21.

In that manner, the media determination section 3B identifies the total correlation pattern Ir, which represents the degree of matching between the unknown disc waveform FDx and the BD disc waveform FTb, and makes a determination as to whether the unknown disc 100x is the BD medium 100b according to the amplitude of the total correlation pattern Ir (i.e. the degree of matching between the waveforms).

That is, the media determination section 3B can make a determination as to whether the optical disc 100 is the BD medium 100b based on the degree of matching between the BD filter waveform FTb, which was obtained from the real BD medium 100b, and the unknown disc waveform FDx, which was obtained from the unknown disc 100x.

Incidentally the DVD determination process by the media determination section 3B uses the same method as that of the BD determination process to make a determination as to whether the unknown disc 100x is the DVD medium 100d. If it assumes that the unknown disc 100x is the DVD medium 100d, the media determination section 3B ends the process.

On the contrary, if it determines that the unknown disc 100x is not the DVD medium 100d, the media determination section 3B starts a CD determination process because the type of the unknown disc 100x still remains unknown.

(2-3-2) CD Determination Process

The following describes the CD determination process in which the system control section 3 of the optical disc device 1 makes a determination as to whether the optical disc 100 is the CD medium 100c.

The media determination section 3B of the system control section 3 starts the CD determination process, lets the CD laser diode 6c emit the CD optical beam Lc from the objective lens 7, and causes the CD optical beam Lc to converge with the numerical aperture being about 0.45.

Then, the media determination section 3B starts a search operation in a similar way to when doing for the BD determination process. Based on a degree of matching between the CD filter waveform FTc set in the CD determination matched filter 23 and the unknown disc waveform FDx, the media determination section 3B makes a determination as to whether the unknown disc 100c is the CD medium 100c.

Even in this case, as shown in FIG. 14, the media determination section 3B can make a determination as to whether the optical disc 100 is the CD medium 100c in a similar way to that of the BD determination process: the media determination section 3B makes a determination as to whether the total correlation pattern Ir, which appears in the filter output signal SO during the determination period KJA of from t22 to t25, is greater than or equal to the total correlation threshold AJc.

In this case, using the CD medium 100c whose signal recording surface has relatively high reflectance (referred to as a high-reflectance CD medium), the system control section 3 has set the CD filter waveform FTc in the CD determination matched filter 23. Accordingly, as shown in FIG. 8C, in the set CD filter waveform FTc, the recording surface reflection pattern PRr is larger than the surface fake pattern PSf1.

On the other hand, if the unknown disc 100x is the low-reflectance CD medium, the amplitude of the surface fake pattern PSf1 is larger than that of the recording surface reflection pattern PRr in the produced pull-in signal SPI as shown in FIG. 5.

Even in such a case, the amplitude of the unknown disc waveform FDx is different from that of the CD filter waveform FTc, but the surface fake pattern PRf1 and the recording surface reflection pattern PRr appear at the same time. Accordingly, the media determination section 3B detects the total correlation pattern Ir with relatively large amplitude in the filter output signal SO.

Accordingly, the total correlation threshold AJc set by the filter determination section 3B is the one that allows the detection of the total correlation pattern Ir even when the unknown disc 100x is the low-reflectance CD medium. This allows the device to appropriately recognize whether the unknown disc 100x is the CD medium 100c by performing a similar process to the BD determination process.

Figure 15A:
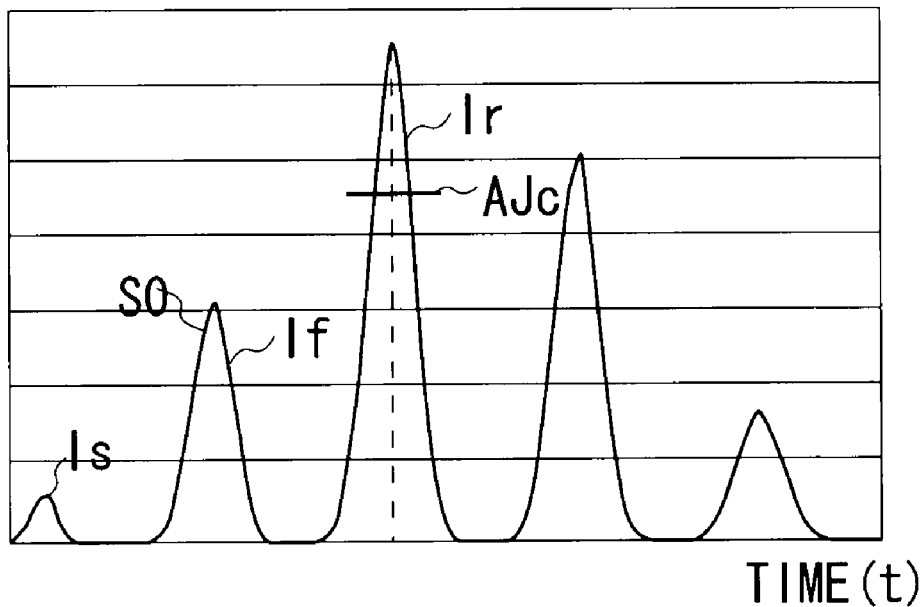
FIGS. 15A and 15B are schematic diagrams illustrating the waveform of a filter output signal during the emission of a CD optical beam.
Figure 15B:
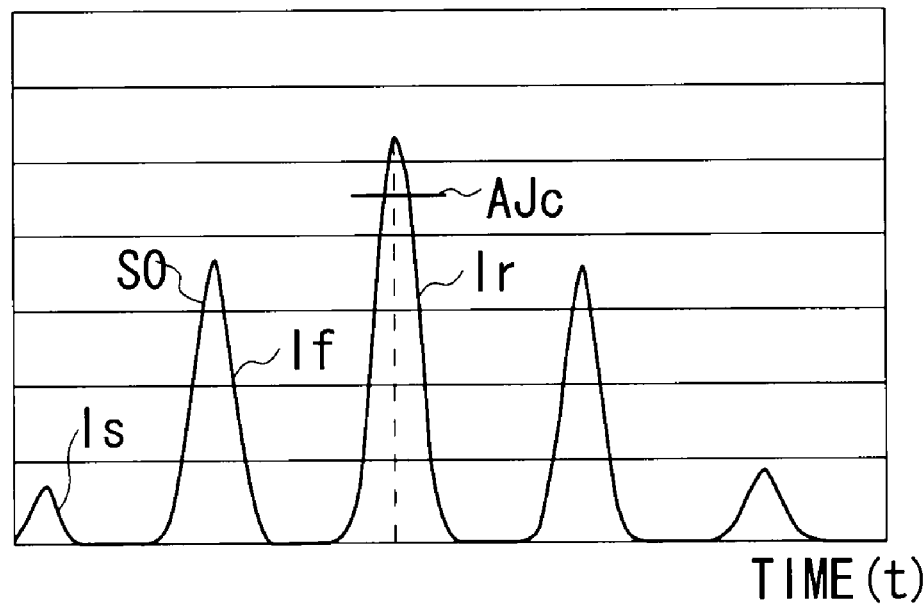

FIG. 15A shows the waveform of the filter output signal SO actually obtained when the unknown disc 100x is the high-reflectance CD medium. Moreover, FIG. 15B shows the wave form of the filter output signal SO obtained when the unknown disc 100x is the low-reflectance CD medium 100.

It is obvious from the diagrams that even regardless of whether it is the high-reflectance CD medium or the low-reflectance CD medium, the total correlation pattern Ir with relatively large amplitude appears during the determination period KJA in the filter output signal SO.

Moreover, if the CD medium 100c is used, a fake correlation pattern If appears between the surface correlation pattern Is and the total correlation pattern Ir. This is because the surface fake pattern PSf appears in the pull-in signal SPI.

However, the media determination section 3B is designed to identify the total correlation pattern Ir and make a determination as to whether the unknown disc 100x is the CD medium 100c according to the amplitude of the total correlation pattern Ir. This prevents the wrong determination regarding the fake correlation pattern Ir.

Incidentally, if it determines that the unknown disc 100x is not the CD medium 100c, the system control section 3 performs an error process to, for example, eject the unknown disc 100x and ends the process.

In that manner, by performing a similar process to the BD determination process, the system control section 3 can appropriately make a determination as to whether the unknown disc 100x is the CD medium 100c.

(3) Procedure of the Process (3-1) Setting of the Filter Waveforms

Figure 16:
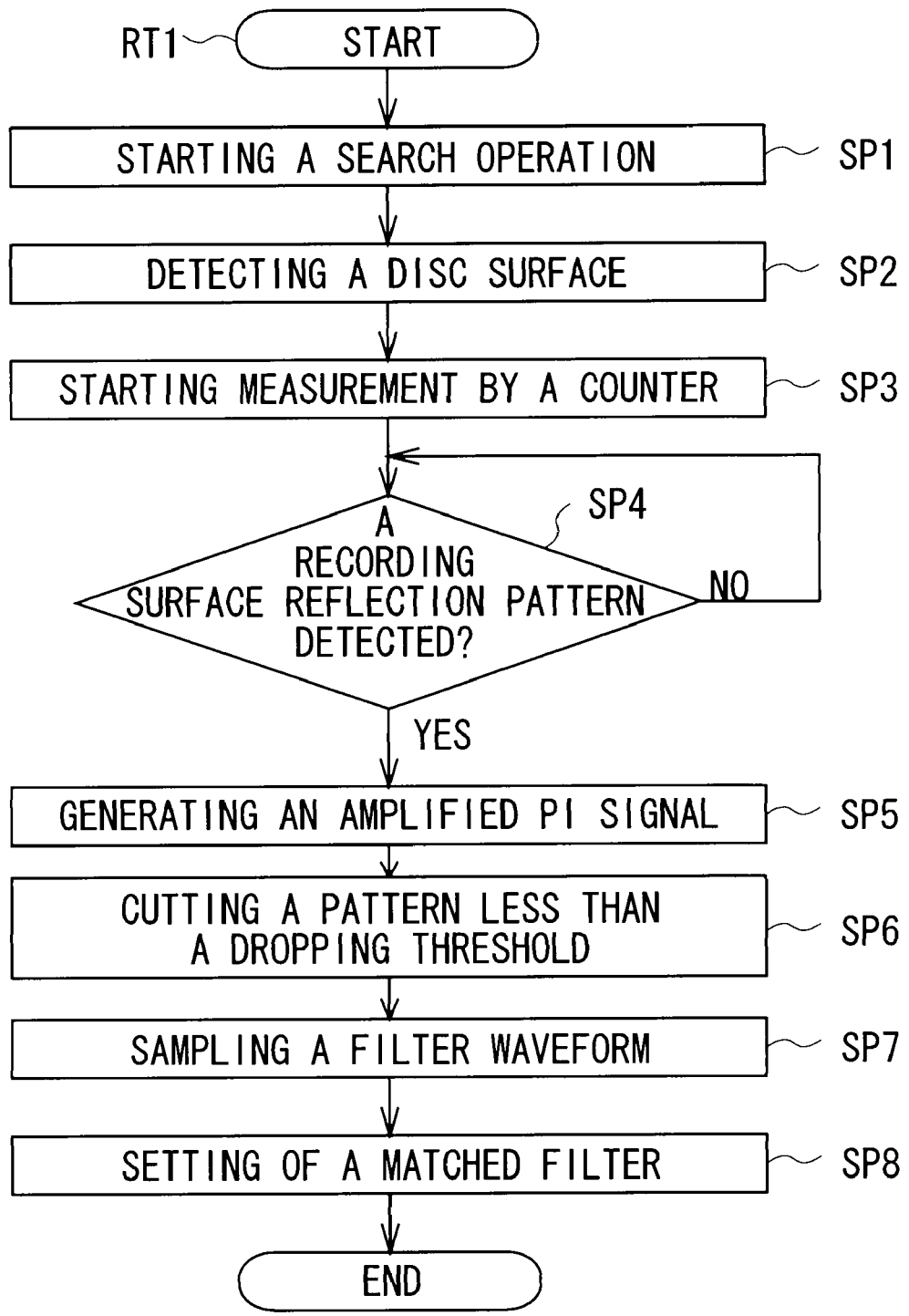
FIG. 16 is a flowchart illustrating the procedure of a filter waveform setting process.

The following describes a filter waveform setting process that the optical disc device 1 performs by executing a filter waveform setting program, with reference to a flowchart shown in FIG. 16.

After receiving a command from an external device, the system control section 3 of the optical disc device 1 starts the procedure RT1 of the filter waveform setting process, and proceeds to the next step SP1.

At step SP1, with the already known type of the optical disc 100 being put in the device, the system control section 3 starts the search operation using the optical beam corresponding to the optical disc 100, starts observing the pull-in signal SPI, and then proceeds to the next step SP2.

At step SP2, the system control section 3 detects the surface reflection pattern PSr from the pull-in signal SPI and therefore assumes that it is in focus on the disc surface. The system control section 3 then proceeds to the next step SP3.

At step SP3, the system control section 3 raises the time measurement signal SM from low level to high level, starts measuring time using the counter, and then proceeds to the next step SP4.

At step SP4, the system control section 3 makes a determination as to whether it has detected the recording surface reflection pattern PRr. If the negative result is obtained at step SP4, the system control section 3 continues to observe the pull-in signal SPI until detecting the recording surface reflection pattern PRr.

Whereas, if the affirmative result is obtained at step SP4, this means that the optical beam is substantially in focus on the signal recording surface. At this time, the system control section 3 calculates the determination start time KJs and the determination end time KJe from the detection time Kk: the detection time Kk starts at a time when the surface reflection pattern PSr is detected and ends at a time when the recording surface reflection pattern PRr is detected. The system control section 3 then ends the search operation, and proceeds to the next step SP5.

At step SP5, the system control section 3 amplifies the pull-in signal SPI to produce the amplified PI signal, and then proceeds to the next step SP6.

At step SP6, the system control section 3 generates the adjusted amplified PI signal by dropping, of all the amplified PI signal's patterns, those whose signal level is less than the dropping threshold from the amplified PI signal so that their signal levels become zero, and then proceeds to the next step SP7.

At step SP7, the system control section 3 samples the signal level of the adjusted amplified PI signal at a predetermined interval to produce the filter value, and then proceeds to the next step SP8.

At step SP8, the system control section 3 sets in a matched filter the filter value as the filter waveform FT, which is the waveform of the adjusted amplified PI signal, and then proceeds to an end step to end the process.

In this manner, the system control section 3 generates the pull-in signal SPI from the already known type of the optical disc 100 and sets its filter waveform FT in the matched filter for use in making a determination regarding the optical disc 100.

Incidentally, for ease of explanation, the processes of step SP5 to SP7 are performed after the detection of the recording surface reflection pattern PRr at step SP4 in the procedure RT1 of the filter waveform setting process. However, the reality is that the processes of step SP5 to SPSP7 are performed in parallel with the process of step SP4.

(3-2) Media Type Determination Process

Figure 17:
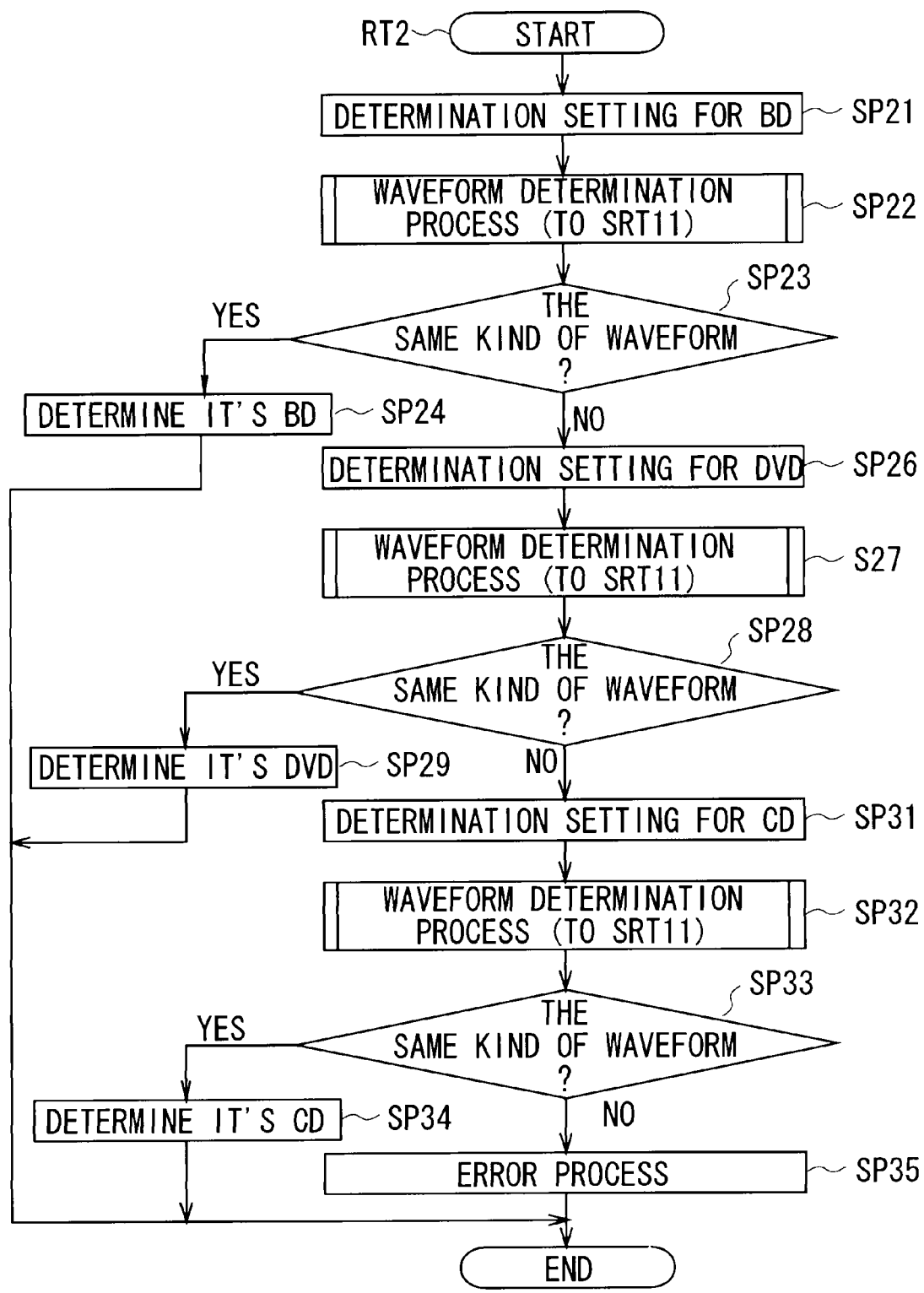
FIG. 17 is a flowchart illustrating the procedure of a media type determination process.

The following describes a media type determination process that the optical disc device 1 performs by executing a media type determination program, with reference to a flowchart shown in FIG. 17.

After the unknown disc 100x is put in the device 1, the system control section 3 of the optical disc device 1 starts the procedure RT2 of the media type determination process, and proceeds to step SP21. At step SP21, the system control section 3 sets the BD determination matched filter 21 as a matched filter to be used as well as the BD optical beam Lb as an optical beam to be used, and then proceeds to the next step SP22.

At step SP22, the system control section 3 proceeds to step SP41 of a subroutine SRT11 to perform a waveform determination process. After making a determination as to whether the unknown disc waveform FDx obtained from the unknown disc 100x is the one obtained form the BD medium 100b, the system control section 3 proceeds to the next step SP23.

At step SP23, during the waveform determination process, the system control section 3 makes a determination as to whether the unknown disc waveform FDx is the one obtained form the BD medium 100b. If the affirmative result is obtained at step SP23, the system control section 3 proceeds to the next step SP24. At step SP24, the system control section 3 determines that the unknown disc 100x put in the device 1 is the BD medium 100b, and then proceeds to an end step to end the process.

Whereas, if the negative result is obtained at step SP23, this means that the unknown disc 100x may be the DVD medium 100d. In this case, the system control section 3 proceeds to the next step SP26.

At step SP26, the system control section 3 sets the DVD determination matched filter 22 as a matched filter to be used as well as the DVD optical beam Ld as an optical beam to be used, and then proceeds to the next step SP27.

At step SP27, the system control section 3 proceeds to step SP41 of the subroutine SRT11 to perform the waveform determination process. After making a determination as to whether the unknown disc waveform FDx obtained from the unknown disc 100x corresponds to the DVD filter waveform FTd obtained form the DVD medium 100d, the system control section 3 proceeds to the next step SP28.

At step SP28, during the waveform determination process, the system control section 3 makes a determination as to whether the unknown disc waveform FDx is the one obtained form the DVD medium 100d. If the affirmative result is obtained at step SP28, the system control section 3 proceeds to the next step SP29. At step SP29, the system control section 3 determines that the unknown disc 100x put in the device 1 is the DVD medium 100d, and then proceeds to the end step to end the process.

Whereas, if the negative result is obtained at step SP28, this means that the unknown disc 100x may be the CD medium 100c. In this case, the system control section 3 proceeds to the next step SP31.

At step SP31, the system control section 3 sets the CD determination matched filter 23 as a matched filter to be used as well as the CD optical beam Lc as an optical beam to be used, and then proceeds to the next step SP32.

At step SP32, the system control section 3 proceeds to step SP41 of the subroutine SRT11 to perform the waveform determination process. After making a determination as to whether the unknown disc waveform FDx obtained from the unknown disc 100x is the one obtained form the CD medium 100c, the system control section 3 proceeds to the next step SP33.

At step SP33, during the waveform determination process, the system control section 3 makes a determination as to whether the unknown disc waveform FDx is the one obtained form the CD medium 100c. If the affirmative result is obtained at step SP33, the system control section 3 proceeds to the next step SP34. At step SP34, the system control section 3 determines that the unknown disc 100x put in the device 1 is the CD medium 100c, and then proceeds to the end step to end the process.

Whereas, if the negative result is obtained at step SP33, this means that the unknown disc 100x is not the BD medium 100b, the DVD medium 100d or the CD medium 100c. In this case, the system control section 3 proceeds to the next step SP35.

At step SP35, the system control section 3 performs an error process, and then proceeds to the end step to end the process.

Figure 18:
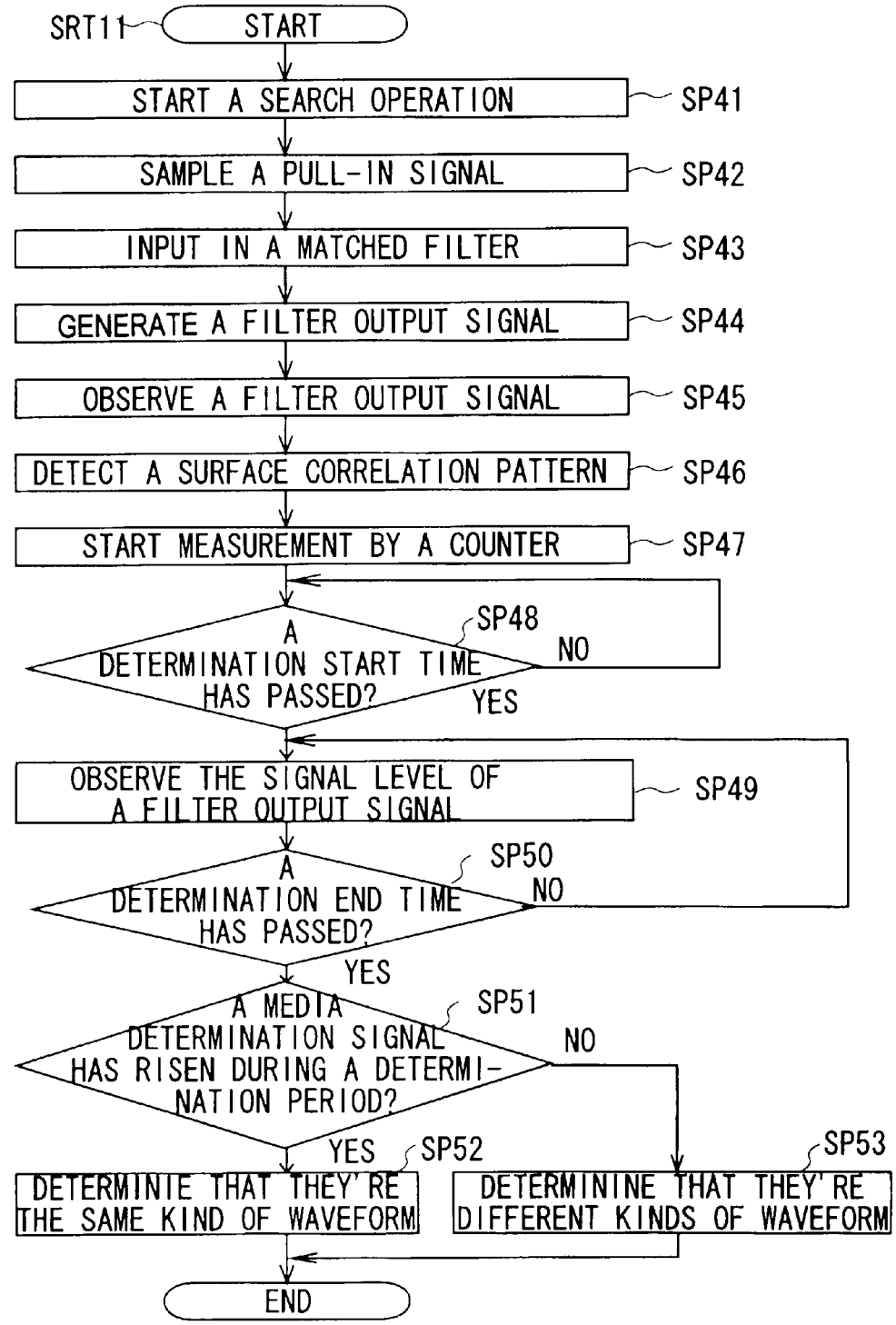
FIG. 18 is a flowchart illustrating the procedure of a waveform determination process.

The following describes the waveform determination process performed at step SP22, step SP27 and step SP32, with reference to a flowchart shown in FIG. 18.

After performing the process of step SP22, SP27 or SP32 of the procedure RT2 of the media type determination process, the system control section 3 of the optical disc device 1 proceeds to step SP41 of the subroutine SRT11 and then starts the waveform determination process.

At step SP41, the system control section 3 starts the search operation and generates the pull-in signal SPI, and then proceeds to the next step SP42.

At step SP42, the system control section 3 samples the pull-in signal SPI at a predetermined interval, and then proceeds to the next step SP43. At step SP43, the system control section 3 input the sampled values into a matched filter as the unknown disc waveform FDx, and then proceeds to the next step SP44.

At step SP44, the system control section 3 calculates a convolution integral of the filter waveform FT and unknown disc waveform FDx set in the matched filter to generate the filter output signal SO representing the degree of matching between the filter waveform FT and the unknown disc waveform FDx, and then proceeds to the next step SP45.

At step SP45, the system control section 3 observes the filter output signal SO, and then proceeds to the next step SP46.

At step SP46, the system control section 3 detects the surface correlation pattern Is from the filter output signal SO, and then proceeds to the next step SP47. At step SP47, the system control section 3 starts measuring time using the counter 25, temporarily stops the observation of the filter output signal SO, and then proceeds to the next step SP48.

At step SP48, the system control section 3 makes a determination as to whether the determination start time KJs has passed since the detection of the surface correlation pattern Is. If the negative result is obtained at step SP48, the system control section 3 then waits until the determination start time KJs has passed.

Whereas, if the affirmative result is obtained at step SP48, this means that it has entered the determination period KJA. The system control section 3 therefore proceeds to the next step SP49.

At step SP49, the system control section 3 restarts the observation of the filter output signal SO, and then proceeds to the next step SP50.

At step SP50, the system control section 3 makes a determination as to whether the determination end time KJe has passed since the detection of the surface correlation pattern Is. If the negative result is obtained, this means that it is still in the determination period KJA. In this case, the system control section 3 continues the observation of the filter output signal SO until the determination end time KJe has passed.

If the affirmative result is obtained at step SP50, the system control section 3 proceeds to the next step SP51. At step SP51, the system control section 3 makes a determination as to whether the media determination signal SD has risen, which occurs when the signal level of the filter output signal SO becomes greater than or equal to the total correlation threshold AJc during the determination period KJA.

If the affirmative result is obtained at step SP51, this means that the degree of matching between the filter waveform FT and the unknown disc waveform FDx is high. In this case, the system control section 3 proceeds to the next step SP52.

At step SP52, the system control section 3 determines that the filter waveform FT and the unknown disc waveform FDx were obtained from the same type of the optical disc 100. After that, the system control section 3 returns to step SP22, step SP27 or step SP32 of the procedure RT1 of the filter waveform setting process and continues the process.

Whereas, if the negative result is obtained at step SP51, this means that the degree of matching between the filter waveform FT and the unknown disc waveform FDx is low. In this case, the system control section 3 proceeds to the next step SP53.

At step SP53, the system control section 3 determines that the filter waveform FT and the unknown disc waveform FDx were obtained from different types of the optical disc 100. After that, the system control section 3 returns to step SP22, step SP27 or step SP32 of the procedure RT1 of the filter waveform setting process and continues the process.

(4) Operation and Effect

With the configuration described above, the optical disc device 1 of the present embodiment emits the CD optical beam Lc (a first optical beam) corresponding to the CD medium 100c (a first optical disc) as well as the BD optical beam corresponding to the BD medium 100b (a second optical disc): the wavelength of the CD optical beam Lc is different from that of the BD optical beam Lb. The optical disc device 1 emits them to the optical disc 100 through one objective lens 7.

The objective lens 7 serves as a lens with a first numerical aperture (approximately 0.45) in a case in which the emitted CD optical beam Lc converges on the signal recording surface of the CD medium 100c. Moreover, the objective lens 7 serves as a lens with a second numerical aperture (approximately 0.85) in a case in which the emitted BD optical beam Lb converges on the signal recording surface of the BD medium 100b.

Furthermore, the optical disc device 1 can drive the objective lens 7 in the focus direction. The optical disc device 1 generates the pull-in signal SPI as a reflection optical signal: the reflection optical signal is based on the amount of light of the reflection optical beam, which is the CD optical beam Lc or the BD optical beam Lb reflected by the CD medium 100c or the BD medium 100b.

Then, the optical disc device 1 generates the CD filter waveform FTc, which represents the waveform of the pull-in signal SPI obtained as a result of emitting the CD optical beam Lc to the CD medium 100c while moving the objective lens 7 in the focus direction, and stores the filter waveform FTc as the CD filter value.

Then, the optical disc device 1 emits the CD optical disc Lc to the unknown disc 100x whose type is unknown while moving the objective lens 7 in the focus direction (i.e. it moves the objective lens close to or away from the optical disc 100) and therefore generates the pull-in signal SPI. The optical disc device 1 then regards the waveform of the pull-in signal SPI as the waveform of the unknown disc waveform, and, based on the degree of matching between this waveform and the CD filter waveform FTc, makes a determination at to whether the unknown disc 100x is the CD medium 100c.

In the optical disc device 1, the nonuse beam U emerges because the objective lens 7 works as a wavelength-selective multifocal lens having a plurality of numerical apertures. As a result, in the optical disc device 1, the fake pattern PSf1, or the reflection of the nonuse beam U from the surface of the CD medium 100c, emerges in the pull-in signal SPI in addition to the surface reflection pattern PSr and the recording surface reflection pattern PRr, which are generated as the CD optical beam having an appropriate focal distance for the CD medium 100c is reflected by the surface and signal recording surface of the CD medium 100c.

The optical disc device 1 compares the unknown disc waveform FDx with the CD filter waveform FTc, and makes a determination as to whether the order and signal level of the following patterns of the unknown disc waveform FDx are substantially the same as those of the CD filter waveform FTc: the fake pattern PSf1, the surface reflection pattern PSr and the recording surface reflection pattern PRr. That is, based on the degree of matching between their waveforms, a determination is made as to whether the unknown disc 100x is the CD medium 100c.

Accordingly, even if there is the fake pattern PSF1 in the unknown disc waveform FDx, the optical disc device 1 confirms the degree of matching between the unknown disc waveform 100x including the fake pattern PSf1 and the CD filter waveform FTc. This helps the optical disc device 1 recognize the media type of the unknown disc 100x appropriately.

According to a typical method, the fake pattern PSf1 is sometimes wrongly recognized as the recording surface reflection pattern PRr, making it difficult for a device to recognize the type of a medium. According to the present embodiment, the "plausible pull-in signal SPI" including the fake pattern PSf1 is stored in the optical disc device 1, and this allows the optical disc device 1 to use the fake pattern PSf1 when making a determination as to whether the unknown disc waveform FDx corresponds to the CD filter waveform FTc. Accordingly, thanks to the fake pattern PSf1, the optical disc device 1 can improve the accuracy of the determination.

Moreover, the optical disc device 1 calculates a convolution integral for the CD filter waveform FTc and the unknown disc waveform FDx to generate the filter output signal SO (a degree-of-matching signal) representing the degree of matching, and makes a determination as to whether the unknown disc 100x is the CD medium 100c according to the signal level of the filter output signal SO.

Accordingly, the optical disc 1 can use a typical matched filter (the CD determination matched filter 23), which performs maximum likelihood estimation according to a statistical parameter estimation theory, to generate the filter output signal SO. This simplifies the configuration of the optical disc device 1.

Moreover, even if the optical disc device 1 keeps supplying voltage to the actuator 8 at a constant level, the speeds of the actuator 8 and the objective lens 7 may change due to a change in ambient temperature. In such cases, the difference in detection time between the surface reflection pattern PSr of the unknown disc waveform FDx and its recording surface reflection pattern PRr would change.

The optical disc device 1 does not simply multiply the CD filter waveform FTc and the unknown disc waveform FDx to calculate a integral, but calculates a convolution integral; that is, the optical disc device 1 moves the unknown disc waveform FDx along the time axis with respect to the CD filter waveform FTc when multiplying them to calculate an integral.

Accordingly, even if the position of the recording surface reflection pattern PRr of the unknown disc waveform FDx has changed with respect to its surface reflection pattern PSr, the optical disc device 1 moves the unknown disc waveform FDx so that the maximum point of the recording surface reflection pattern PRr of the unknown disc waveform Tx exactly corresponds to the maximum point of the recording surface reflection pattern PRr of the CD filter waveform FTc on the time axis.

As a result, the optical disc device 1 can increase the signal level of the filter output signal SO at a position where the maximum point of the recording surface reflection pattern PRr corresponds to that of another recording surface reflection pattern PRr: the recording surface reflection patterns PRr are larger than the surface reflection patterns PSr, and also have a large impact on the signal level of the filter output signal SO. In this manner, the optical disc device 1 can reduce the change of the signal level of the maximum point of the total correlation pattern Ir even as the position of the recording surface reflection pattern PRr of the unknown disc waveform FDx changes. This improves accuracy in determining media type.

Furthermore, when the signal level of the total correlation pattern Ir is greater than or equal to the total correlation threshold AJc, the optical disc device 1 determines that the unknown disc 100x is the CD medium 100c: the total correlation pattern Ir appears when there is a small difference in time between the CD filter waveform FTc and the unknown disc waveform FDx in the filter output signal SO.

Accordingly, only when the degree of matching between the CD filter waveform FTc and the unknown disc waveform FDx is high, the optical disc device 1 determines that the unknown disc 100x is the CD medium 100c. This reduces the possibility that the optical disc device 1 mistakenly recognizes the type of media.

Moreover, the optical disc device 1 inputs the unknown disc waveform FDx with its front side facing the rear side of the CD filter waveform FTc and moves the unknown disc waveform FDx in order to produce the filter output signal SO.

The detection time Kk starts at a time when the surface reflection pattern PSr, which represents the surface of the CD medium 100c, is detected from the CD filter waveform FTc, and ends at a time when the recording surface reflection pattern PRr, which represents the signal recording surface of the CD medium 100c, is detected; the optical disc device 1 calculates the determination start time KJs and the determination end time KJe by adding the detection time Kk and the predetermined before-and-after time and subtracting the before-and-after time from the detection time Kk.

The optical disc device 1 observes the signal level during the determination period KJA: the determination period KJA starts at a time when the determination start time KJs has passed since a starting time when the surface correlation pattern Is was detected from the filter output signal SO, and ends at a time when the determination end time KJe has passed since that starting time.

This means that a pattern that appears during the determination period KJA is recognized by the optical disc device 1 as the total correlation pattern Ir: the determination period KJA starts at a time when the surface correlation pattern Is, which indicates that the surface reflection pattern PSr of the unknown disc waveform FDx has overlapped with the recording surface reflection pattern PRr of the CD filter waveform FTc, is detected, and continues until the detection time Kk has passed.

Since the time from when the surface reflection pattern PSr of the unknown disc waveform FDx has overlapped with the recording surface reflection pattern PRr of the CD filter waveform FTc until this surface reflection pattern PSr has overlapped with the surface reflection patter PSr of the CD filter waveform FTc is substantially the same as the detection time Kk, the optical disc device 1 can precisely recognize the total correlation pattern Ir.

In other words, if the unknown disc 100x is the CD medium 100c, the CD filter waveform FTC substantially corresponds to the unknown disc waveform FDx in the direction of the time axis during the determination period KJA in theory. Therefore, the optical disc device 1 can use the degree of matching between the waveforms during the determination period KJA for making a determination as to whether the unknown disc 100x is the CD medium 100c.

Furthermore, the optical disc device 1 uses the pull-in signal, which is a positive number and represents the total intensity of the reflection optical beam, as the CD filter waveform FTc and the unknown disc waveform FDx. This simplifies the arithmetic process of the CD determination matched filter 23 more than when using the focus error signal SFE, which can be both positive and negative numbers.

Moreover, the optical disc device 1 emits the CD optical beam Lc to the CD medium 100c while moving the objective lens 7 in the focus direction, amplifies the obtained pull-in signal SPI, cuts off a pattern with small amplitude, and then produces the CD filter waveform FTc based on the waveform of the pull-in signal SPI.

This allows the optical disc device 1 to perform the CD determination process using the CD filter waveform FTc that it has obtained. Accordingly, the optical disc device 1 can determine the type of media more precisely since the characteristics of its own actuator 8 can be reflected in the CD filter waveform FTc.

Furthermore, the optical disc device 1 makes a determination as to whether the unknown disc 100x is a CD-type disc, or the CD medium 100c.

Since the objective lens 7 serving as a wavelength-selective multifocal lens has a plurality of numerical apertures and these apertures are totally different, the overall efficiency for light utilization of the CD optical beam Lc and the BD optical beam generally decreases due to the design of the objective lens 7. Moreover, in the optical disc device 1, the numerical aperture of the CD optical beam Lc is smaller than the numerical aperture of the BD optical beam Lb, the efficiency for light utilization of the CD optical beam LC especially decreases while the ratio of the nonuse beam U increases.

This may cause a fake pattern Pf with large amplitude in the pull-in signal SPI when the optical disc device 1 is using the CD optical beam Lc. But since it applies the above-described method when using the CD optical beam Lc, the optical disc device 1 can precisely recognize the CD medium 100c. Moreover, by comparing the waveforms having the fake patterns Pf, the optical disc device 1 can distinguish them from the waveforms not having the fake patterns Pf: by making use of the fake patterns Pf appearing in the pull-in signal SPI, the optical disc device 1 can precisely recognize the type of the unknown disc 100x.

Moreover, the optical disc device 1 emits the BD optical beam Lb to the BD medium 100b while moving the objective lens 7 in the focus direction to produce the pull-in signal SPI, and then stores the BD filter waveform FTx representing the pull-in signal SPI's waveform as the BD filter value. Then, the optical disc device 1 emits the BD optical beam Lb to the unknown disc 100x while moving the objective lens 7 in the focus direction to produce the pull-in signal SPI; the optical disc device 1 then makes a determination as to whether the unknown disc 100x is the BD medium 100b based on the degree of matching between the pull-in signal SPI's waveform, or the unknown disc waveform FDx, and the BD filter waveform FTb.

Therefore, the optical disc device 1 can precisely recognize the type of media even if they are either the BD media 100b or the CD media 100b.

Furthermore, the optical disc device 1 does not use the CD optical beam Lc, but uses the BD optical beam Lb, whose efficiency for light utilization is high and which corresponds to the BD medium 100$b$, to make a determination as to whether the unknown disc 100$x$ is the BD medium 100$b$. If it determines that the unknown disc 100$x$ is not the BD medium 100$b$, the optical disc device 1 performs the DVD determination process and then the determination process regarding CD: after making a determination regarding the BD medium 100$b$, the optical disc device 1 makes a determination as to whether the unknown disc 100$x$ is the CD medium 100$c$ by using the CD optical beam Lc corresponding to the CD medium 100$c$.

In this manner, the optical disc device 1 performs the determination processes in an order that makes it easy for the optical disc device 1 to appropriately recognize the type of media: the first determination process should be for the optical disc 100 from which the fake pattern PF is rarely generated and whose pull-in signal SPI's waveform is relatively simple.

According to the above configuration, the optical disc device 1 emits the CD optical beam Lc to the CD medium 100$c$, whose type is already known, while moving the objective lens 7 in the focus direction, and obtains the pull-in signal SPI; based on the degree of matching between the obtained pull-in signal SPI's waveform, or the CD filter waveform FTc, and the unknown disc waveform FDx, which was obtained as a result of emitting the CD optical beam Lc to the unknown disc 100$x$, the optical disc device 1 makes a determination as to whether the unknown disc 100$x$ is the CD medium 100$c$. Therefore, the optical disc device 1 can accurately recognize whether the unknown disc 100$x$ is the CD medium 100$c$ regardless of whether there is the fake pattern Pf or not. Thus, the optical disc device and media type determination method capable of accurately recognizing the type of optical discs can be realized.

(5) Other Embodiments

In the above-noted embodiment, the objective lens 7 has three numerical apertures. However, the present invention is not limited to this. It may have two, four or more numerical apertures.

Moreover, in the above-noted embodiment, during the search operation, the optical disc device 1 moves the objective lens 7, which is situated away from the optical disc 100, toward the optical disc 100. However, the present invention is not limited to this. The optical disc device 1 may move the objective lens 7, which is situated near the optical disc 100, away from the optical disc 100.

Furthermore, in the above-noted embodiment, the optical disc device 1 obtains the pull-in signal SPI from the already known type of the optical disc 100 and stores its waveform as the filter waveform FT. However, the present invention is not limited to this. The waveform of the pull-in signal that was obtained by another optical disc device may be stored as the filter waveform.

Furthermore, in the above-noted embodiment, the optical disc device 1 samples the filter waveform FT, and stores the sampled values as the filter values. However, the present invention is not limited to this. The optical disc device 1 may store the filter waveform FT instead of the filter values.

Furthermore, in the above-noted embodiment, the optical disc device 1 samples the filter waveform FT and the unknown disc waveform FDx at the same interval. However, the present invention is not limited to this. The interval for the filter waveform FT may be different from the interval for the unknown disc waveform FDx.

Furthermore, in the above-noted embodiment, the optical disc device 1 moves the objective lens 7 at the same motion speed even when performing the filter waveform setting process or the media type determination process. However, the present invention is not limited to this. The motion speed for the filter waveform setting process may be different from the motion speed for the media type determination process: this method can offer the same effect as the above-noted embodiment does if the optical disc device 1 corrects the motion speed appropriately during the waveform determination process of the media type determination process.

Furthermore, in the above-noted embodiment, the optical disc device 1 calculates the degree of matching between the filter waveform FT and the unknown disc waveform FDx using a matched filter that calculates a convolution integral of the filter waveform FT and the unknown disc waveform FDx. However, the present invention is not limited to this. The optical disc device 1 may calculate the degree of matching by simply multiplying them and calculating an integral after the surface reflection patterns PSr are aligned with one another in the direction of the time axis.

Furthermore, in the above-noted embodiment, the optical disc device 1 uses the pull-in signal SPI as a reflection optical signal. However, the present invention is not limited to this. The focus error signal SFE may be used as the reflection optical signal instead of the pull-in signal PSI.

Furthermore, in the above-noted embodiment, even during the BD determination process, the optical disc device 1 makes a determination as to whether the unknown disc 100$x$ is the BD medium 100$b$ based on the amplitude of the filter output signal SO. However, the present invention is not limited to this. The optical disc device 1 may make a determination as to whether the unknown disc 100$x$ is the BD medium 100$b$ according to the distance from the surface of the unknown disc 100$x$ to its signal recording surface.

Furthermore, in the above-noted embodiment, the optical disc device 1 makes a determination as to whether the filter output signal SO is greater than or equal to the total correlation threshold AJ to recognize the type of the unknown disc 100$x$ during the determination period KJA. However, the present invention is not limited to this. The optical disc device 1 may continuously observe the filter output signal SO and make a determination as to whether its amplitude is greater than or equal to a predetermined threshold in order to recognize the type of the unknown disc 100$x$.

Furthermore, in the above-noted embodiment, in order to generate the filter waveform FT, the optical disc device 1 performs the process of amplifying the pull-in signal SPI obtained from the already known type of the optical disc 100, and the process of cutting a pattern that is less than the dropping threshold off the pull-in signal SPI. However, one of those processes, or both can be omitted, or another process can be applied to generate the filter waveform FT.

Furthermore, in the above-noted embodiment, the optical disc device 1 inputs the unknown disc waveform FDx with its front side facing the rear side of the filter waveform FT. However, the present invention is not limited to this. The optical disc device 1 may turn around the pull-in signal SPI in the direction of the time axis, store its waveform as the filter waveform FT, and input the unknown disc waveform FDx with its front side facing the front side of the filter waveform FT. In short, the unknown disc waveform FDx should be input from the opposite side of the time axis to the filter waveform FT.

Furthermore, in the above-noted embodiment, during the filter waveform setting process, the optical disc device 1 starts observing the pull-in signal SPI after the pull-in signal SPI is generated, and generates the filter waveform FT from the pull-in signal SPI. However, the present invention is not limited to this. The optical disc device 1 may buffer the pull-in signal SPI, end the search operation after detecting the recording surface reflection pattern PRr, and then reads out the pull-in signal SPI to generate the filter waveform FT.

Furthermore, in the above-noted embodiment, during the media type determination process, the optical disc device 1 inputs the pull-in signal SPI in the matched filter as the unknown disc waveform FDx after the pull-in signal SPi is generated. However, the present invention is not limited to this. The optical disc device 1 may observe and buffer the pull-in signal SPI, end the search operation after detecting the recording surface reflection pattern PRr, and then reads out the pull-in signal SPI to generate the unknown disc waveform FDx.

Furthermore, in the above-noted embodiment, the optical disc device 1 performs the determination processes regarding the type of media in order of decreasing light-utilization efficiency. However, the present invention is not limited to this. Ignoring the light-utilization efficiency, the optical disc device 1 may perform the determination processes in various orders.

Furthermore, in the above-noted embodiment, during the search operation, the optical disc device 1 moves the objective lens 7 at a constant motion speed. However, the present invention is not limited to this. The optical disc device 1 may move the objective lens 7 at an arbitrary speed.

Furthermore, in the above-noted embodiment, if it determines, during the CD determination process, that the disc is not the CD medium 100c, the optical disc device 1 then performs the predetermined error process. However, the present invention is not limited to this. The optical disc device 1 may just end the process.

Furthermore, in the above-noted embodiment, during the filter waveform setting process, the optical disc device 1 stores the determination start time KJs and the determination end time KJe, which were calculated from the detection time Kk. However, the present invention is not limited to this. The optical disc device 1 may store the detection time Kk, and, during the media type determination process, calculate the determination start time KJs and the determination end time KJe from the detection time Kk. The before and after times that are added to or subtracted from the detection time Kk may be the same or different.

Furthermore, in the above-noted embodiment, the optical disc device 1 sets the CD filter waveform FTC obtained from the high-reflectance CD medium in the CD determination matched filter 23. However, the present invention is not limited to this. The CD filter waveform FTC set in the CD determination matched filter 23 may be generated from the low-reflectance CD medium. In such cases, the optical disc device 1, during the filter waveform setting process, sets, as the recording surface detection threshold ARc, a signal level that allows the device 1 to detect the recording surface reflection pattern PRr, and assumes that it has detected the recording surface reflection pattern PRr after detecting that pattern two times using the recording surface detection threshold ARc.

Furthermore, in the above-noted embodiment, the objective lens 7 includes a combination of a condenser lens and an optical element. However, the present invention is not limited to this. The objective lens 7 may include only the condenser lens.

Furthermore, in the above-noted embodiment, the beams that the objective lens 7 supports are the CD beam with a wavelength of 780 mm, the DVD beam with a wavelength of 660 mm, and the BD beam with a wavelength of 405 mm. However, the present invention is not limited to this. The objective lens 7 may support another optical beam with a different wavelength.

Furthermore, in the above-noted embodiment, the laser diode 6 includes the CD laser diode 6c, the DVD laser diode 6d, and the BD laser diode 6b, each of which emits a single-wavelength laser beam. However, the present invention is not limited to this. The laser diode 6 may include a combination of a two-wavelength laser diode, which can emit two types of laser beams for CD and DVD, and the BD laser diode 6b, or it may only include a three-wavelength laser diode, which can emit three types of laser beams for CD, DVD and BD.

Furthermore, in the above-noted embodiment, the optical disc device 1 can perform both recording and reproducing processes: it records information on the optical disc 100 and reproduces information from the optical disc 100. However, the present invention is not limited to this. The above-noted methods can be applied to an optical disc reproduction device that only performs the reproduction process or an optical disc recording device that only performs the recording process. Furthermore, the above-noted methods may be applied to the optical disc device 1 that performs both recording and reproducing processes for the CD medium 100c and the DVD medium 100d but only performs the reproducing process for the BD medium 100b.

Furthermore, in the above-noted embodiment, the optical disc device 1 (an optical disc device) includes the laser diode 6c (a first beam source), the laser diode 6b (a second beam source), the objective lens 7 (an objective lens), the actuator 8 (a drive section), the signal generation section 10 (a signal processing section), ROM (a storage section), and the media type determination section 3B (a type determination section). However, the present invention is not limited to this. The optical disc device that includes the first beam source, the second beam source, the objective lens, the drive section, the signal processing section, the storage section, and the media type determination section can be configured in a different manner.

The above methods can be applied to an optical disc device that supports a variety of optical media.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc device comprising:
a first beam source that emits a first optical beam corresponding to a first optical disc;
a second beam source that emits a second optical beam that corresponds to a second optical disc and whose wavelength is different from that of the first optical beam;
an objective lens that serves as a lens having a first numerical aperture when the first optical beam converges on a signal recording surface of the first optical disc while serving as a lens having a second numerical aperture when the second optical beam converges on a signal recording surface of the second optical disc;
a drive section that drives the objective lens in a focus direction along which the objective lens moves close to or away from the optical disc;
a signal processing section that generates a reflection optical signal based on the intensity of a reflection optical beam that is the first or second optical beam reflected by the first or second optical disc;
a storage section that stores a first disc waveform representing the waveform of the reflection optical signal to be obtained when the first optical beam is emitted to the first optical disc while the objective lens is moved in the focus direction; and
a type determination section that makes a determination as to whether or not an unknown disc, whose type is unknown, is the first optical disc based on a degree of matching between the first disc waveform and a first unknown disc waveform representing the waveform of the reflection optical signal obtained when the first optical beam is emitted to the unknown disc while the objective lens is moved in the focus direction, the type determination section calculating a convolution integral of the first disc waveform and the first unknown disc waveform to generate a degree-of-matching signal representing the degree of matching, and makes a determination as to whether or not the unknown disc is the first optical disc based on the signal level of the degree-of-matching signal, the type determination section determining that the unknown disc is the first optical disc when the signal level of a total correlation pattern is greater than or equal to a total correlation threshold,
wherein the total correlation pattern appears in the degree-of-matching signal when there is a small difference in time between the first disc waveform and the first unknown disc waveform, and the type determination section generates the degree-of-matching signal by imputing, with respect to the first disc waveform, the first unknown disc waveform from the opposite side of a time axis and moving the first unknown disc waveform in the direction of the time axis; the type determination section assumes that a detection time starts at a time when a surface reflection pattern representing the surface of the first optical disc is detected in the first disc waveform and ends at a time when a recording surface reflection pattern representing the signal recording surface of the first optical disc is detected; and the type determination section recognizes a pattern appearing during a determination period as the total correlation pattern, wherein the determination period starts at a time when a surface correlation pattern indicating that the surface reflection pattern of the first unknown disc waveform has overlapped with the recording surface reflection pattern of the first disc waveform is detected and continues until the detection time has passed.

2. The optical disc device according to claim 1, wherein the type determination section calculates a convolution integral of the first disc waveform and the first unknown disc waveform to generate a degree-of-matching signal representing the degree of matching, and makes a determination as to whether or not the unknown disc is the first optical disc based on the signal level of the degree-of-matching signal.

3. The optical disc device according to claim 2, wherein the type determination section determines that the unknown disc is the first optical disc when the signal level of a total correlation pattern is greater than or equal to a total correlation threshold, wherein the total correlation pattern appears in the degree-of-matching signal when there is a small difference in time between the first disc waveform and the first unknown disc waveform.

4. The optical disc device according to claim 1, wherein the type determination section inputs the first unknown disc waveform with its front side facing the rear side of the first disc waveform.

5. The optical disc device according to claim 1, further comprising
a disc waveform generation section that generates a first disc waveform based on the waveform of the reflection optical signal obtained when the first optical beam is emitted to the first optical disc while the objective lens is moved in the focus direction.

6. The optical disc device according to claim 1, wherein the reflection optical signal is a pull-in signal representing the total intensity of the reflection optical beam.

7. The optical disc device according to claim 1, wherein the first optical disc is a Compact Disc (CD) type.

8. The optical disc device according to claim 1, wherein the storage section stores a second disc waveform representing the waveform of the reflection optical signal to be obtained when the second optical beam is emitted to the second optical disc while the objective lens is moved in the focus direction; the type determination section makes a determination as to whether or not the unknown disc is the second optical disc based on a degree of matching between the second disc waveform and a second unknown disc waveform representing the waveform of the reflection optical signal obtained when the second optical beam is emitted to the unknown disc while the objective lens is moved in the focus direction.

9. The optical disc device according to claim 1, wherein the type determination section makes a determination as to whether or not the unknown disc is the second optical disc based on a distance from the surface of the unknown disc to its signal recording surface.

10. The optical disc device according to claim 6, wherein the type determination section makes a determination as to whether or not the unknown disc is one of the optical discs using an optical beam for which the efficiency for light utilization of the objective lens is high, wherein the used optical beam is either the first optical beam or the second optical beam; and if the determination made by the type determination section is that the unknown disc is not one of the optical discs, the type determination section then makes a determination as to whether or not the unknown disc is the other optical disc using the other optical beam corresponding to the other optical disc.

11. The optical disc device according to claim 1, further comprising
a third beam source that emits a third optical beam that corresponds to a third optical disc and whose wavelength is different from that of the first optical beam, wherein the objective lens serves as a lens having a third numerical aperture when the third optical beam converges on a signal recording surface of the third optical disc.

12. A media type determination method for an optical disc device including an objective lens that serves as a lens having a first numerical aperture when a first optical beam corresponding to a first optical disc converges on a signal recording surface of the first optical disc, that serves as a lens having a second numerical aperture when a second optical beam that corresponds to a second optical disc and whose wavelength is different from that of the first optical beam converges on a signal recording surface of the second optical disc, and serves as a lens having a third numerical aperture when a third optical beam that corresponds to a third optical disc and whose wavelength is different from that of the first optical beam and the second optical beam converges on a signal recording surface of the third optical disc, the method comprising:

driving the objective lens in a focus direction along which the objective lens moves close to or away from the optical disc;

generating a reflection optical signal based on the intensity of a reflection optical beam that is the first, second, or third optical beam reflected by the first, second, or third optical disc, the generating including first testing the unknown disc using the first optical beam with a highest optical efficiency, then testing the unknown disc using the second optical beam if the unknown disc is not the first optical disc, and then testing the unknown disc using the third optical beam if the unknown disc is not the second optical disc, the third optical beam having a lowest optical efficiency; and making a determination as to whether or not an unknown disc, whose type is unknown, is the first optical disc, the second optical disc, or the third optical disc based on a degree of matching between the first disc waveform, a second disc waveform, or a third disc waveform and a first unknown disc waveform representing the waveform of the reflection optical signal obtained when an optical beam is emitted to the unknown disc while the objective lens is moved in the focus direction, wherein the making a determination includes generating a degree-of-matching signal by imputing, with respect to the first disc waveform, the first unknown disc waveform from the opposite side of a time axis and moving the first unknown disc waveform in the direction of the time axis;

assuming that a detection time starts at a time when a surface reflection pattern representing the surface of the first optical disc is detected in the first disc waveform and ends at a time when a recording surface reflection pattern representing the signal recording surface of the first optical disc is detected; and recognizing a pattern appearing during a determination period as the total correlation pattern, wherein the determination period starts at a time when a surface correlation pattern indicating that the surface reflection pattern of the first unknown disc waveform has overlapped with the recording surface reflection pattern of the first disc waveform is detected and continues until the detection time has passed.

\* \* \* \* \*